(12) United States Patent
Ying et al.

(10) Patent No.: US 10,027,636 B2
(45) Date of Patent: Jul. 17, 2018

(54) DATA TRANSMISSION METHOD, APPARATUS, AND SYSTEM

(71) Applicant: HUAWEI TECHNOLOGIES CO., LTD., Shenzhen (CN)

(72) Inventors: Jiangwei Ying, Beijing (CN); Yang Cui, Tokyo (JP); Xiaolong Guo, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 144 days.

(21) Appl. No.: 14/851,337

(22) Filed: Sep. 11, 2015

(65) Prior Publication Data

US 2016/0006707 A1 Jan. 7, 2016

Related U.S. Application Data

(63) Continuation of application No. PCT/CN2013/072550, filed on Mar. 13, 2013.

(51) Int. Cl.
*H04L 29/06* (2006.01)
*H04W 88/04* (2009.01)
(Continued)

(52) U.S. Cl.
CPC ........ *H04L 63/0464* (2013.01); *H04L 9/0838* (2013.01); *H04W 12/02* (2013.01);
(Continued)

(58) Field of Classification Search
CPC .................................................. H04L 63/0464
See application file for complete search history.

(56) References Cited

U.S. PATENT DOCUMENTS 9,226,142 B2 * 12/2015 Fukuda ................ H04L 63/061
2007/0055862 A1 3/2007 Sharma et al.
(Continued)

FOREIGN PATENT DOCUMENTS

CN 101414860 4/2009
CN 102598740 7/2012

OTHER PUBLICATIONS

PCT International Search Report dated Dec. 12, 2013 in corresponding International Patent Application No. PCT/CN2013/072550.
International Search Report dated Dec. 12, 2013, in corresponding International Application No. PCT/CN2013/072550.

*Primary Examiner* — Morshed Mehedi
(74) *Attorney, Agent, or Firm* — Staas & Halsey LLP

(57) ABSTRACT

The present invention relates to a data transmission method, apparatus, and system. The method includes: obtaining, by a benefited device, a cooperative-layer key, performing encryption, or encryption and integrity protection processing on uplink data by using the cooperative-layer key at a cooperative layer to obtain first encrypted data, performing encapsulation processing on the first encrypted data to obtain first encapsulated data, and sending the first encapsulated data to a supporting device in a short-distance communication mode, so that the supporting device processes the first encapsulated data to obtain second encapsulated data and sends the second encapsulated data to a base station. In embodiments of the present invention, secure data transmission is implemented between the benefited device, the supporting device, and the base station in a cooperative communication process, which improves network security and reliability of data transmission.

6 Claims, 11 Drawing Sheets

(51) Int. Cl.
*H04L 9/08* (2006.01)
*H04W 12/02* (2009.01)
*H04W 76/14* (2018.01)
*H04W 12/04* (2009.01)
*H04W 12/10* (2009.01)

(52) U.S. Cl.
CPC ......... *H04W 88/04* (2013.01); *H04L 2209/80* (2013.01); *H04L 2463/061* (2013.01); *H04W 12/04* (2013.01); *H04W 12/10* (2013.01); *H04W 76/14* (2018.02)

(56) References Cited

U.S. PATENT DOCUMENTS

| | | | | |
|---|---|---|---|---|
| 2007/0253444 | A1* | 11/2007 | Poyhonen | H04L 12/14 370/466 |
| 2008/0090572 | A1* | 4/2008 | Cha | H04L 63/068 455/436 |
| 2009/0325479 | A1* | 12/2009 | Chakrabarti | H04B 7/0417 455/7 |
| 2012/0163597 | A1* | 6/2012 | Pan | H04L 9/0891 380/255 |
| 2012/0231739 | A1* | 9/2012 | Chen | H04B 7/026 455/41.2 |
| 2013/0083722 | A1* | 4/2013 | Bhargava | H04W 48/20 370/315 |
| 2014/0120874 | A1* | 5/2014 | Kang | H04W 12/04 455/411 |

* cited by examiner

DATA TRANSMISSION METHOD, APPARATUS, AND SYSTEM

CROSS-REFERENCE TO RELATED APPLICATIONS

This application is a continuation of International Application No. PCT/CN2013/072550, filed on Mar. 13, 2013, which is hereby incorporated by reference in its entirety.

TECHNICAL FIELD

The present invention relates to the field of communications, and in particular, to a data transmission method, apparatus, and system.

BACKGROUND

With the rapid development of mobile communications technologies, mobile communications network systems of multiple standards emerge, for example, a Global System for Mobile Communications (Global System for Mobile communication, GSM) network, a General Packet Radio Service (General Packet Radio Service, GPRS) system, a Wideband Code Division Multiple Access (Wideband Code Division Multiple Access, WCDMA) network, a CDMA-2000 network, a Time Division-Synchronous Code Division Multiple Access (Time Division-Synchronous Code Division Multiple Access, TD-SCDMA) network, and a Worldwide Interoperability for Microwave Access (Worldwide Interoperability for Microwave Access, WiMAX) network. In addition to voice communication services, generally, these mobile communications network systems also provide data communication services, so that users may use the data communication services provided by these mobile communications systems to upload and download various types of data.

When an environment in which a user equipment is located deteriorates, throughput and/or reliability of data transmission of the user equipment declines abruptly, and a multi-user cooperative communications (Multiple User Cooperative Communication, MUCC) technology may be used to support the data transmission of the user equipment. In MUCC, because the cooperative layer is located above a Packet Data Convergence Protocol (Packet Data Convergence Protocol, PDCP) layer, split data (including user plane data and possible control plane data (where the control plane data may be transmitted through a direct link between a benefited device and a base station, that is, not through a supporting device; and may also be transmitted through a link between the supporting device and the base station)) of the benefited device needs to pass through the PDCP layer of the supporting device before reaching the cooperative layer: Uplink data of the benefited device needs to pass through a short-distance communication layer between the supporting device and the benefited device, and after being processed by the benefited device at the cooperative layer, is forwarded to the base station by the support UE through a Uu interface, while downlink data of the benefited device needs to pass through the Uu interface (needing to pass through the PDCP layer) between the base station and the supporting device, and after being processed by the supporting device at the cooperative layer, is delivered to the benefited device through the short-distance communication layer between the supporting device and the benefited device.

To ensure security of data transmission between the benefited device, the supporting device, and the base station, the PDCP layer in an existing LTE mechanism may perform compression on an IP header of a data packet and perform encryption on data in the data packet (including encryption on user plane data, and encryption and integrity protection on control plane data). In MUCC, if a PDCP-layer key of the benefited device is used to perform encryption, that is, the base station uses the PDCP-layer key of the benefited device to encrypt data in a downlink direction, while the benefited device uses the PDCP-layer key of the benefited device to encrypt data in an uplink direction, the supporting device cannot successfully decrypt data of the benefited device at the PDCP layer, so that the supporting device cannot process data to be forwarded to the benefited device and forward data to be forwarded to a network device to the network side. In addition, security encryption protection needs to be performed on the data of the benefited device, so as to prevent the supporting device from obtaining information of the benefited device.

SUMMARY

Embodiments of the present invention provide a data transmission method, apparatus, and system to implement secure data transmission between a benefited device, a supporting device, and a base station in a cooperative communication process, and improve network security and reliability of data transmission.

According to a first aspect, an embodiment of the present invention provides a data transmission method, including:

obtaining, by a benefited device, a cooperative-layer key, and performing encryption, or encryption and integrity protection processing on uplink data by using the cooperative-layer key at a cooperative layer to obtain first encrypted data;

performing encapsulation processing on the first encrypted data to obtain first encapsulated data; and sending the first encapsulated data to a supporting device in a short-distance communication mode, so that the supporting device processes the first encapsulated data to obtain second encapsulated data and sends the second encapsulated data to a base station.

In a first possible implementation manner, the obtaining, by a benefited device, a cooperative-layer key specifically includes: performing authentication and key agreement with a network side to obtain a parent key, and obtaining, through calculation, the cooperative-layer key according to the parent key; or performing authentication and key agreement with a network side to obtain a parent key, generating a base-station key according to the parent key, generating an access-stratum key according to the base-station key, and obtaining, through calculation, the cooperative-layer key according to the base-station key or the access-stratum key.

With reference to the first possible implementation manner of the first aspect, in a second possible implementation manner, the method further includes: performing encryption algorithm negotiation and integrity protection algorithm negotiation with the base station to obtain a cooperative-layer encryption algorithm and a cooperative-layer integrity protection algorithm.

With reference to the second possible implementation manner of the first aspect, in a third possible implementation manner, the cooperative-layer key includes a cooperative-layer encryption key and a cooperative-layer integrity key, and when the uplink data is user plane data, the performing encryption, or encryption and integrity protection processing on uplink data by using the cooperative-layer key at a cooperative layer specifically includes: performing, according to the cooperative-layer encryption algorithm, encryption on the uplink data by using the cooperative-layer encryption key at the cooperative layer; or performing, according to the cooperative-layer encryption algorithm, encryption on the uplink data by using the cooperative-layer encryption key at the cooperative layer, and performing, according to the cooperative-layer integrity protection algorithm, integrity protection processing on the uplink data by using the cooperative-layer integrity key.

With reference to the second possible implementation manner of the first aspect, in a fourth possible implementation manner, the cooperative-layer key includes a cooperative-layer encryption key and a cooperative-layer integrity key, and when the uplink data is control plane data, the performing encryption, or encryption and integrity protection processing on uplink data by using the cooperative-layer key at a cooperative layer specifically includes: performing, according to the cooperative-layer encryption algorithm, encryption on the uplink data by using the cooperative-layer encryption key at the cooperative layer, and performing, according to the cooperative-layer integrity protection algorithm, integrity protection processing on the uplink data by using the cooperative-layer integrity key.

With reference to the first possible implementation manner of the first aspect, in a fifth possible implementation manner, the performing encapsulation processing on the first encrypted data to obtain first encapsulated data specifically includes: performing cooperative-layer encapsulation on the first encrypted data at the cooperative layer to obtain second encapsulated data; and performing short-distance communication encapsulation on the second encapsulated data at a short-distance communication layer to obtain the first encapsulated data.

With reference to the fifth possible implementation manner of the first aspect, in a sixth possible implementation manner, before the performing short-distance communication encapsulation on the second encapsulated data at a short-distance communication layer to obtain the first encapsulated data, the method further includes: obtaining a short-distance-communication-layer key, a short-distance-communication-layer encryption algorithm, and a short-distance-communication-layer integrity protection algorithm; and performing, according to the short-distance-communication-layer encryption algorithm and the short-distance-communication-layer integrity protection algorithm, encryption and integrity protection processing on the second encapsulated data by using the short-distance-communication-layer key.

With reference to the sixth possible implementation manner of the first aspect, in a seventh possible implementation manner, the obtaining a short-distance-communication-layer key specifically includes: receiving the short-distance-communication-layer key sent by the network side, where the short-distance-communication-layer key is generated by the network side according to the parent key; or generating the short-distance-communication-layer key according to a key generator, and forwarding the short-distance-communication-layer key to the supporting device through the network side.

With reference to the sixth possible implementation manner of the first aspect, in an eighth possible implementation manner, the obtaining a short-distance-communication-layer key specifically includes: receiving a first group of parameters sent by the network side, where the first group of parameters is parameters generated by the network side and used by the benefited device to perform key agreement with the supporting device; and after the supporting device receives a second group of parameters, performing, by the benefited device, key agreement with the supporting device, and generating the short-distance-communication-layer key, where the second group of parameters is parameters generated by the network side and used by the supporting device to perform key agreement with the benefited device.

With reference to the sixth possible implementation manner of the first aspect, in a ninth possible implementation manner, the obtaining a short-distance-communication-layer key specifically includes: generating a third group of parameters and sending the third group of parameters to the supporting device; receiving a fourth group of parameters sent by the supporting device, where the fourth group of parameters is generated and sent after the supporting device receives the third group of parameters; generating a shared key according to the fourth group of parameters; and obtaining, through calculation, the short-distance-communication-layer key according to the shared key, identity information of the benefited device, and identity information of the supporting device.

With reference to the sixth possible implementation manner of the first aspect, in a tenth possible implementation manner, the method further includes: receiving data that is sent by the supporting device in the short-distance communication mode; and performing decryption processing on the data by using the cooperative-layer key of the benefited device to obtain decrypted data, or performing decryption and integrity verification processing on the data by using the cooperative-layer key of the benefited device to obtain decrypted data.

With reference to the tenth possible implementation manner of the first aspect, in an eleventh possible implementation manner, after the receiving data that is sent by the supporting device in the short-distance communication mode, and before the performing decryption, or decryption and integrity verification processing on the data by using the cooperative-layer key of the benefited device, the method further includes: performing, by using the short-distance-communication-layer key, decryption and integrity verification on the data sent by the supporting device.

With reference to the first aspect or the first, the second, the third, the fourth, the fifth, the sixth, the seventh, the eighth, the ninth, the tenth, or the eleventh possible implementation manner of the first aspect, in a twelfth possible implementation manner, the short-distance communication mode is a cellular communication mode, or a wireless fidelity Wi-fi mode, or a Bluetooth mode, or an device-to-device D2D mode, or a near field communication NFC mode.

According to a second aspect, an embodiment of the present invention provides a data transmission method, including:

receiving, by a supporting device, first data, which is sent by a benefited device in a short-distance communication mode;

verifying integrity of the first data by using a short-distance-communication-layer key, and decrypting the first data to obtain second data, where the second data is data obtained through encryption, or encryption and integrity protection by the benefited device by using a cooperative-layer key of the benefited device;

after processing the second data at a cooperative layer, performing encryption processing, or encryption and integrity protection processing on the second data at a Packet Data Convergence Protocol PDCP layer to obtain third data; and sending the third data to a base station, so that the base station performs decryption, or decryption and integrity verification on the third data by using a PDCP-layer key of the supporting device to obtain the second data, and decrypts the second data by using the cooperative-layer key of the benefited device.

In a first possible implementation manner, before the receiving, by a supporting device, first data, which is sent by a benefited device in a short-distance communication mode, the method further includes: obtaining the short-distance-communication-layer key.

With reference to the first possible implementation manner of the second aspect, in a second possible implementation manner, the obtaining the short-distance-communication-layer key specifically includes: receiving the short-distance-communication-layer key sent by the network side; or receiving the short-distance-communication-layer key generated according to a key generator by the benefited device and forwarded by the network side; or receiving a second group of parameters sent by the network side, where the second group of parameters is parameters generated by the network side and used by the supporting device to perform key agreement with the benefited device, and after the benefited device receives a first group of parameters, performing, by the supporting device, key agreement with the benefited device, and generating the short-distance-communication-layer key, where the first group of parameters is parameters generated by the network side and used by the benefited device to perform key agreement with the supporting device; or receiving a third group of parameters sent by the benefited device, generating a fourth group of parameters and a shared key, sending the fourth group of parameters to the benefited device, and obtaining, through calculation, by the supporting device, the short-distance-communication-layer key according to the shared key, identity information of the benefited device, and identity information of the supporting device.

With reference to the first possible implementation manner of the second aspect, in a third possible implementation manner, the method further includes: receiving data sent by the base station, and performing short-distance communication encryption and integrity protection processing on the data to obtain fourth data; and sending the fourth data to the benefited device in the short-distance communication mode.

With reference to the first, the second, or the third possible implementation manner of the second aspect, in a fourth possible implementation manner, the short-distance communication mode is a cellular communication mode, or a wireless fidelity Wi-fi mode, or a Bluetooth mode, or an device-to-device D2D mode, or a near field communication NFC mode.

According to a third aspect, an embodiment of the present invention provides a data transmission method, including:

receiving, by a base station, first data sent by a supporting device;

performing decryption, or decryption and integrity verification on the first data by using a PDCP-layer key of the supporting device, so as to obtain second data; and decrypting the second data by using a cooperative-layer key of a benefited device to obtain third data.

In a first possible implementation manner, before the receiving first data sent by a supporting device, the method further includes: obtaining the cooperative-layer key.

With reference to the first possible implementation manner of the third aspect, in a second possible implementation manner, the obtaining the cooperative-layer key specifically includes: receiving the cooperative-layer key sent by a mobility management entity; or performing authentication and key agreement with the benefited device to obtain a parent key, and obtaining, through calculation, the cooperative-layer key according to the parent key; or performing authentication and key agreement with the benefited device to obtain a parent key, generating a base-station key according to the parent key, generating an access-stratum key according to the base-station key, and obtaining, through calculation, the cooperative-layer key according to the base-station key or the access-stratum key.

With reference to the second possible implementation manner of the third aspect, in a third possible implementation manner, before the decrypting the second data by using a cooperative-layer key of a benefited device, the method further includes: verifying integrity of the second data.

With reference to the second possible implementation manner of the third aspect, in a fourth possible implementation manner, the method further includes: performing, at a cooperative layer by using a cooperative-layer encryption key, encryption processing on data to be sent to the benefited device to obtain fourth data; and sending the fourth data to the supporting device, so that the supporting device processes the fourth data and sends the processed data to the benefited device.

According to a fourth aspect, an embodiment of the present invention provides a data transmission apparatus, including:

an encryption unit, configured to obtain a cooperative-layer key, perform encryption, or encryption and integrity protection processing on uplink data by using the cooperative-layer key at a cooperative layer to obtain first encrypted data, and transmit the first encrypted data to an encapsulation unit;

the encapsulation unit, configured to receive the first encrypted data sent by the encryption unit, perform encapsulation processing on the first encrypted data to obtain first encapsulated data, and transmit the first encapsulated data to a sending unit; and the sending unit, configured to receive the first encapsulated data sent by the encapsulation unit, and send the first encapsulated data to a supporting device in a short-distance communication mode, so that the supporting device processes the first encapsulated data to obtain second encapsulated data and sends the second encapsulated data to a base station.

In a first possible implementation manner, the encryption unit is specifically configured to perform authentication and key agreement with a network side to obtain a parent key, and obtain, through calculation, the cooperative-layer key according to the parent key; or perform authentication and key agreement with a network side to obtain a parent key, generate a base-station key according to the parent key, generate an access-stratum key according to the base-station key, and obtain, through calculation, the cooperative-layer key according to the base-station key or the access-stratum key.

With reference to the first possible implementation manner of the fourth aspect, in a second possible implementation manner, the encryption unit is further configured to perform encryption algorithm negotiation and integrity protection algorithm negotiation with the base station to obtain a cooperative-layer encryption algorithm and a cooperative-layer integrity protection algorithm.

With reference to the second possible implementation manner of the fourth aspect, in a third possible implementation manner, the cooperative-layer key includes a cooperative-layer encryption key and a cooperative-layer integrity key, and when the uplink data is user plane data, the encryption unit is specifically configured to: perform, according to the cooperative-layer encryption algorithm, encryption on the uplink data by using the cooperative-layer encryption key at the cooperative layer; or perform, according to the cooperative-layer encryption algorithm, encryption on the uplink data by using the cooperative-layer encryption key at the cooperative layer, and perform, according to the cooperative-layer integrity protection algorithm, integrity protection processing on the uplink data by using the cooperative-layer integrity key.

With reference to the second possible implementation manner of the fourth aspect, in a fourth possible implementation manner, the cooperative-layer key includes a cooperative-layer encryption key and a cooperative-layer integrity key, and when the uplink data is control plane data, the encryption unit is specifically configured to: perform, according to the cooperative-layer encryption algorithm, encryption on the uplink data by using the cooperative-layer encryption key at the cooperative layer, and perform, according to the cooperative-layer integrity protection algorithm, integrity protection processing on the uplink data by using the cooperative-layer integrity key.

With reference to the first possible implementation manner of the fourth aspect, in a fifth possible implementation manner, the encapsulation unit is specifically configured to: perform cooperative-layer encapsulation on the first encrypted data at the cooperative layer to obtain second encapsulated data; and perform short-distance communication encapsulation on the second encapsulated data at a short-distance communication layer to obtain the first encapsulated data.

With reference to the fifth possible implementation manner of the fourth aspect, in a sixth possible implementation manner, the encryption unit is specifically configured to: obtain a short-distance-communication-layer key, a short-distance-communication-layer encryption algorithm, and a short-distance-communication-layer integrity protection algorithm; and perform, according to the short-distance-communication-layer encryption algorithm and the short-distance-communication-layer integrity protection algorithm, encryption and integrity protection processing on the second encapsulated data by using the short-distance-communication-layer key.

With reference to the sixth possible implementation manner of the fourth aspect, in a seventh possible implementation manner, the encryption unit is specifically configured to: receive the short-distance-communication-layer key sent by the network side, where the short-distance-communication-layer key is generated by the network side according to the parent key; or generate the short-distance-communication-layer key according to a key generator, and forward the short-distance-communication-layer key to the supporting device through the network side.

With reference to the sixth possible implementation manner of the fourth aspect, in an eighth possible implementation manner, the encryption unit is specifically configured to: receive a first group of parameters sent by the network side, where the first group of parameters is parameters generated by the benefited device to perform key agreement with the supporting device; and after the supporting device receives a second group of parameters, perform key agreement with the supporting device, and generate the short-distance-communication-layer key, where the second group of parameters is parameters generated by the network side and used by the supporting device to perform key agreement with the benefited device.

With reference to the sixth possible implementation manner of the fourth aspect, in a ninth possible implementation manner, the encryption unit is specifically configured to: generate a third group of parameters and send the third group of parameters to the supporting device; receive a fourth group of parameters sent by the supporting device, where the fourth group of parameters is generated and sent after the supporting device receives the third group of parameters; generate a shared key according to the fourth group of parameters; and obtain, through calculation, the short-distance-communication-layer key according to the shared key, identity information of the benefited device, and identity information of the supporting device.

With reference to the sixth possible implementation manner of the fourth aspect, in a tenth possible implementation manner, the apparatus further includes a receiving unit and a decryption unit, where the receiving unit is configured to receive data that is sent by the supporting device in the short-distance communication mode; and the decryption unit is configured to perform decryption processing on the data by using the cooperative-layer key of the benefited device to obtain decrypted data, or configured to perform decryption and integrity verification processing on the data by using the cooperative-layer key of the benefited device to obtain decrypted data.

With reference to the tenth possible implementation manner of the fourth aspect, in an eleventh possible implementation manner, the decryption unit is further configured to perform, by using the short-distance-communication-layer key, decryption and integrity verification on the data sent by the supporting device.

With reference to the fourth aspect or the first, the second, the third, the fourth, the fifth, the sixth, the seventh, the eighth, the ninth, the tenth, or the eleventh possible implementation manner of the fourth aspect, in a twelfth possible implementation manner, the short-distance communication mode is a cellular communication mode, or a wireless fidelity Wi-fi mode, or a Bluetooth mode, or an device-to-device D2D mode, or a near field communication NFC mode.

According to a fifth aspect, an embodiment of the present invention provides a data transmission apparatus, including:

a receiving unit, configured to receive first data, which is sent by a benefited device in a short-distance communication mode, and transmit the first data to a decryption unit;

the decryption unit, configured to receive the first data transmitted by the receiving unit, verify integrity of the first data by using a short-distance-communication-layer key, decrypt the first data to obtain second data, where the second data is data obtained through encryption, or encryption and integrity protection by the benefited device by using a cooperative-layer key of the benefited device, and transmit the second data to a processing unit;

the processing unit, configured to receive the second data transmitted by the decryption unit, and after processing the second data at a cooperative layer, perform encryption processing, or encryption and integrity protection processing on the second data at a Packet Data Convergence Protocol PDCP layer to obtain third data, and transmit the third data to a sending unit; and the sending unit, configured to receive the third data sent by the processing unit, and send the third data to a base station, so that the base station performs decryption, or decryption and integrity verification on the third data by using a PDCP-layer key of the supporting device to obtain the second data, and decrypts the second data by using the cooperative-layer key of the benefited device.

In a first possible implementation manner, the apparatus further includes: an obtaining unit, configured to obtain the short-distance-communication-layer key.

With reference to the first possible implementation manner of the fifth aspect, in a second possible implementation manner, the obtaining unit is specifically configured to: receive the short-distance-communication-layer key sent by the network side; or receive the short-distance-communication-layer key generated according to a key generator by the benefited device and forwarded by the network side; or receive a second group of parameters sent by the network side, where the second group of parameters is parameters generated by the network side and used by the supporting device to perform key agreement with the benefited device, and after the benefited device receives a first group of parameters, perform key agreement with the benefited device, and generate the short-distance-communication-layer key, where the first group of parameters is parameters generated by the network side and used by the benefited device to perform key agreement with the supporting device; or receive a third group of parameters sent by the benefited device, generate a fourth group of parameters and a shared key, send the fourth group of parameters to the benefited device, and obtain, through calculation, the short-distance-communication-layer key according to the shared key, identity information of the benefited device, and identity information of the supporting device.

With reference to the first possible implementation manner of the fifth aspect, in a third possible implementation manner, the apparatus further includes an encryption unit, where the encryption unit is configured to receive data sent by the base station, and perform short-distance communication encryption and integrity protection processing on the data to obtain fourth data; and the sending unit is further configured to send the fourth data to the benefited device in the short-distance communication mode.

With reference to the fifth aspect, or the first, the second, or the third possible implementation manner of the fifth aspect, in a fourth possible implementation manner, the short-distance communication mode is a cellular communication mode, or a wireless fidelity Wi-fi mode, or a Bluetooth mode, or an device-to-device D2D mode, or a near field communication NFC mode.

According to a sixth aspect, an embodiment of the present invention provides a data transmission apparatus, including:

a receiving unit, configured to receive first data sent by a supporting device and transmit the first data to a decryption unit; and the decryption unit, configured to receive the first data sent by the receiving unit, perform decryption, or decryption and integrity verification on the first data by using a PDCP-layer key of the supporting device, so as to obtain second data, and decrypt the second data by using a cooperative-layer key of a benefited device to obtain third data.

In a first possible implementation manner, the apparatus further includes: an obtaining unit, configured to obtain the cooperative-layer key.

With reference to the first possible implementation manner of the sixth aspect, in a second possible implementation manner, the obtaining unit is specifically configured to: receive the cooperative-layer key generated and sent by a mobility management entity or a base station; or perform authentication and key agreement with the benefited device to obtain a parent key, and obtain, through calculation, the cooperative-layer key according to the parent key; or perform authentication and key agreement with the benefited device to obtain a parent key, generate a base-station key according to the parent key, generate an access-stratum key according to the base-station key, and obtain, through calculation, the cooperative-layer key according to the base-station key or the access-stratum key.

With reference to the second possible implementation manner of the sixth aspect, in a third possible implementation manner, the decryption unit is further configured to verify integrity of the second data.

With reference to the second possible implementation manner of the sixth aspect, in a fourth possible implementation manner, the apparatus further includes an encryption unit and a sending unit, where the encryption unit is configured to perform, at a cooperative layer by using a cooperative-layer encryption key, encryption processing on data to be sent to the benefited device to obtain fourth data; and the sending unit is configured to send the fourth data to the supporting device, so that the supporting device processes the fourth data and sends the processed data to the benefited device.

According to a seventh aspect, an embodiment of the present invention provides a benefited device, including:

a processor, configured to obtain a cooperative-layer key, perform encryption, or encryption and integrity protection processing on uplink data by using the cooperative-layer key at a cooperative layer to obtain first encrypted data, perform encapsulation processing on the first encrypted data to obtain first encapsulated data, and transmit the first encapsulated data to a transmitter; and the transmitter, configured to receive the first encapsulated data sent by the processor, and send the first encapsulated data to a supporting device in a short-distance communication mode, so that the supporting device processes the first encapsulated data to obtain second encapsulated data and sends the second encapsulated data to a base station.

In a first possible implementation manner, the processor is specifically configured to: perform authentication and key agreement with a network side to obtain a parent key, and obtain, through calculation, the cooperative-layer key according to the parent key; or perform authentication and key agreement with a network side to obtain a parent key, generate a base-station key according to the parent key, generate an access-stratum key according to the base-station key, and obtain, through calculation, the cooperative-layer key according to the base-station key or the access-stratum key.

With reference to the first possible implementation manner of the seventh aspect, in a second possible implementation manner, the processor is further configured to perform encryption algorithm negotiation and integrity protection algorithm negotiation with the base station to obtain a cooperative-layer encryption algorithm and a cooperative-layer integrity protection algorithm.

With reference to the second possible implementation manner of the seventh aspect, in a third possible implementation manner, the cooperative-layer key includes a cooperative-layer encryption key and a cooperative-layer integrity key, and when the uplink data is user plane data, the processor is specifically configured to: perform, according to the cooperative-layer encryption algorithm, encryption on the uplink data by using the cooperative-layer encryption key at the cooperative layer; or perform, according to the cooperative-layer encryption algorithm, encryption on the uplink data by using the cooperative-layer encryption key at the cooperative layer, and perform, according to the cooperative-layer integrity protection algorithm, integrity protection processing on the uplink data by using the cooperative-layer integrity key.

With reference to the second possible implementation manner of the seventh aspect, in a fourth possible implementation manner, the cooperative-layer key includes a cooperative-layer encryption key and a cooperative-layer integrity key, and when the uplink data is control plane data, the processor is specifically configured to: perform, according to the cooperative-layer encryption algorithm, encryption on the uplink data by using the cooperative-layer encryption key at the cooperative layer, and perform, according to the cooperative-layer integrity protection algorithm, integrity protection processing on the uplink data by using the cooperative-layer integrity key.

With reference to the first possible implementation manner of the seventh aspect, in a fifth possible implementation manner, the processor is specifically configured to: perform cooperative-layer encapsulation on the first encrypted data at the cooperative layer to obtain second encapsulated data; and perform short-distance communication encapsulation on the second encapsulated data at a short-distance communication layer to obtain the first encapsulated data.

With reference to the fifth possible implementation manner of the seventh aspect, in a sixth possible implementation manner, the processor is specifically configured to: obtain a short-distance-communication-layer key, a short-distance-communication-layer encryption algorithm, and a short-distance-communication-layer integrity protection algorithm; and perform, according to the short-distance-communication-layer encryption algorithm and the short-distance-communication-layer integrity protection algorithm, encryption and integrity protection processing on the second encapsulated data by using the short-distance-communication-layer key.

With reference to the sixth possible implementation manner of the seventh aspect, in a seventh possible implementation manner, the processor is specifically configured to: receive the short-distance-communication-layer key sent by the network side, where the short-distance-communication-layer key is generated by the network side according to the parent key; or generate the short-distance-communication-layer key according to a key generator, and forward the short-distance-communication-layer key to the supporting device through the network side.

With reference to the sixth possible implementation manner of the seventh aspect, in an eighth possible implementation manner, the processor is specifically configured to: receive a first group of parameters sent by the network side, where the first group of parameters is parameters generated by the network side and used by the benefited device to perform key agreement with the supporting device; and after the supporting device receives a second group of parameters, perform key agreement with the supporting device, and generate the short-distance-communication-layer key, where the second group of parameters is parameters generated by the network side and used by the supporting device to perform key agreement with the benefited device.

With reference to the sixth possible implementation manner of the seventh aspect, in a ninth possible implementation manner, the processor is specifically configured to: generate a third group of parameters and send the third group of parameters to the supporting device; receive a fourth group of parameters sent by the supporting device, where the fourth group of parameters is generated and sent after the supporting device receives the third group of parameters; generate a shared key according to the fourth group of parameters; and obtain, through calculation, the short-distance-communication-layer key according to the shared key, identity information of the benefited device, and identity information of the supporting device.

With reference to the sixth possible implementation manner of the seventh aspect, in a tenth possible implementation manner, the benefited device further includes a receiver, where the receiver is configured to receive data that is sent by the supporting device in the short-distance communication mode; and the processor is configured to perform decryption processing on the data by using the cooperative-layer key of the benefited device to obtain decrypted data, or configured to perform decryption and integrity verification processing on the data by using the cooperative-layer key of the benefited device to obtain decrypted data.

With reference to the tenth possible implementation manner of the seventh aspect, in an eleventh possible implementation manner, the processor is further configured to perform, by using the short-distance-communication-layer key, decryption and integrity verification on the data sent by the supporting device.

With reference to the seventh aspect or the first, the second, the third, the fourth, the fifth, the sixth, the seventh, the eighth, the ninth, the tenth, or the eleventh possible implementation manner of the seventh aspect, in a twelfth possible implementation manner, the short-distance communication mode is a cellular communication mode, or a wireless fidelity Wi-fi mode, or a Bluetooth mode, or an device-to-device D2D mode, or a near field communication NFC mode.

According to an eighth aspect, an embodiment of the present invention provides a supporting device, including:

a receiver, configured to receive first data, which is sent by a benefited device in a short-distance communication mode, and transmit the first data to a processor;

the processor, configured to receive the first data transmitted by the receiver, verify integrity of the first data by using a short-distance-communication-layer key, and decrypt the first data to obtain second data, where the second data is data obtained through encryption, or encryption and integrity protection by the benefited device by using a cooperative-layer key of the benefited device; and after processing the second data at a cooperative layer, perform encryption processing, or encryption and integrity protection processing on the second data at a Packet Data Convergence Protocol PDCP layer to obtain third data, and transmit the third data to a transmitter; and the transmitter, configured to receive the third data sent by the processor, and send the third data to a base station, so that the base station performs decryption, or decryption and integrity verification on the third data by using a PDCP-layer key of the supporting device to obtain the second data, and decrypts the second data by using the cooperative-layer key of the benefited device.

In a first possible implementation manner, the processor is further configured to obtain the short-distance-communication-layer key.

With reference to the first possible implementation manner of the eighth aspect, in a second possible implementation manner, the processor is specifically configured to: receive the short-distance-communication-layer key sent by the network side; or receive the short-distance-communication-layer key generated according to a key generator by the benefited device and forwarded by the network side; or receive a second group of parameters sent by the network side, where the second group of parameters is parameters generated by the network side and used by the supporting device to perform key agreement with the benefited device, and after the benefited device receives a first group of parameters, perform key agreement with the benefited device, and generate the short-distance-communication-layer key, where the first group of parameters is parameters generated by the network side and used by the benefited device to perform key agreement with the supporting device; or receive a third group of parameters sent by the benefited device, generate a fourth group of parameters and a shared key, send the fourth group of parameters to the benefited device, and obtain, through calculation, the short-distance-communication-layer key according to the shared key, identity information of the benefited device, and identity information of the supporting device.

With reference to the first possible implementation manner of the eighth aspect, in a third possible implementation manner, the processor is further configured to receive data sent by the base station, perform short-distance communication encryption and integrity protection processing on the data to obtain fourth data, and the transmitter is configured to send the fourth data to the benefited device in the short-distance communication mode.

With reference to the eighth aspect, or the first, the second, or the third possible implementation manner of the eighth aspect, in a fourth possible implementation manner, the short-distance communication mode is a cellular communication mode, or a wireless fidelity Wi-fi mode, or a Bluetooth mode, or an device-to-device D2D mode, or a near field communication NFC mode.

According to a ninth aspect, an embodiment of the present invention provides a base station, including:

a receiver, configured to receive first data sent by a supporting device and transmit the first data to a processor; and the processor, configured to receive the first data sent by the receiver, perform decryption, or decryption and integrity verification on the first data by using a PDCP-layer key of the supporting device, so as to obtain second data, and decrypt the second data by using a cooperative-layer key of a benefited device to obtain third data.

In a first possible implementation manner, the processor is further configured to obtain the cooperative-layer key.

With reference to the first possible implementation manner of the ninth aspect, in a second possible implementation manner, the processor is specifically configured to: receive the cooperative-layer key sent by a mobility management entity; or perform authentication and key agreement with the benefited device to obtain a parent key, and obtain, through calculation, the cooperative-layer key according to the parent key; or perform authentication and key agreement with the benefited device to obtain a parent key, generate a base-station key according to the parent key, generate an access-stratum key according to the base-station key, and obtain, through calculation, the cooperative-layer key according to the base-station key or the access-stratum key.

With reference to the second possible implementation manner of the ninth aspect, in a third possible implementation manner, the processor is further configured to verify integrity of the second data.

With reference to the second possible implementation manner of the ninth aspect, in a fourth possible implementation manner, the base station further includes a transmitter, where the processor is further configured to perform, at a cooperative layer by using a cooperative-layer encryption key, encryption processing on data to be sent to the benefited device to obtain fourth data; and the transmitter is configured to send the fourth data to the supporting device, so that the supporting device processes the fourth data and sends the processed data to the benefited device.

According to a tenth aspect, an embodiment of the present invention provides a data transmission system, including the foregoing data transmission apparatus and a mobility management entity.

According to an eleventh aspect, an embodiment of the present invention provides a data transmission system, including the foregoing supporting device, benefited device, and base station, and a mobility management entity.

In the embodiments of the present invention, a benefited device obtains a cooperative-layer key, performs encryption, or encryption and integrity protection processing on uplink data by using the cooperative-layer key at a cooperative layer to obtain first encrypted data, performs encapsulation processing on the first encrypted data to obtain first encapsulated data, and sends the first encapsulated data to a supporting device in a short-distance communication mode, so that the supporting device processes the first encapsulated data to obtain second encapsulated data and sends the second encapsulated data to a base station. In this way, a problem that in a cooperative communication process, data transmitted between the benefited device and the base station through the supporting device is obtained by the supporting device or eavesdropped or tampered by another device, is avoided. In the present invention, when a sender (the benefited device or the base station) sends data, a key unknown to the supporting device is used to perform encryption and integrity protection on the data at a cooperative layer, so that the supporting device cannot obtain the data; in addition, encryption and integrity protection are performed on the data at a short-distance communication layer, so that the data is not eavesdropped and tampered by another user equipment when the data is transmitted in the short-distance communication mode between the supporting device and the benefited device, thereby implementing secure data transmission between the benefited device, the supporting device, and the base station in the cooperative communication process, and improving network security and reliability of data transmission.

DESCRIPTION OF EMBODIMENTS

Figure 1:
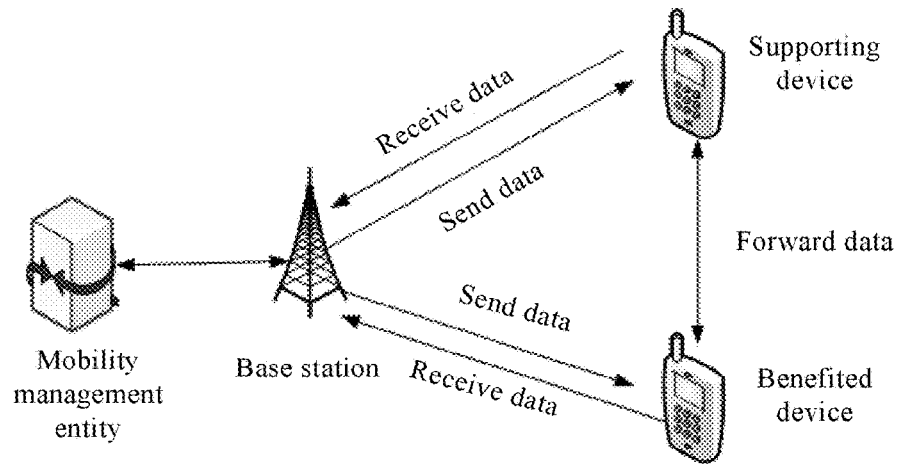
FIG. 1 is a schematic diagram of an application architecture of a data transmission method according to an embodiment of the present invention.

In the following description, for a purpose of description rather than limitation, details such as a specific system structure, an interface, and a technology are described to help understand the present invention thoroughly. However, a person skilled in the art should clearly understand that the present invention may also be implemented in other embodiments without such details. In other cases, details about a well-known apparatus, circuit, and method are omitted to avoid affecting the description of the present invention by unnecessary details.

The technology described in this specification may be applied to various communications systems, for example, a current 2G or 3G communications system and a next-generation communications system, for example, a Global System for Mobile communications (GSM, Global System for Mobile communications), a Code Division Multiple Access (CDMA, Code Division Multiple Access) system, a Time Division Multiple Access (TDMA, Time Division Multiple Access) system, a Wideband Code Division Multiple Access Wireless (WCDMA, Wideband Code Division Multiple Access Wireless) system, a Frequency Division Multiple Access (FDMA, Frequency Division Multiple Access) system, an Orthogonal Frequency Division Multiple Access (OFDMA, Orthogonal Frequency-Division Multiple Access) system, a Single Carrier FDMA (SC-FDMA) system, a General Packet Radio Service (GPRS, General Packet Radio Service) system, a Long Term Evolution (LTE, Long Term Evolution) system, and other similar communications systems.

In this specification, various aspects are described in combination with a user equipment and/or a base station.

The user equipment may be a wireless terminal and may also be a wired terminal, where the wireless terminal may be a device providing a user with voice and/or data connectivity, a handheld device with a wireless connection function, or another processing device connected to a wireless modem. The wireless terminal may communicate with one or more core networks through a radio access network (RAN, Radio Access Network), and the wireless terminal may be a mobile terminal, for example, a mobile phone (or called a "cellular" phone) and a computer with a mobile terminal, for example, may be a portable, pocket-sized, handheld, computer built-in, or vehicle-mounted mobile apparatus, which exchanges voice and/or data with the wireless access network, for example, a personal communication service (PCS, Personal Communication Service) phone, a cordless phone, a Session Initiation Protocol (SIP) phone, a wireless local loop (WLL, Wireless Local Loop) station, and a personal digital assistant (PDA, Personal Digital Assistant). The wireless terminal may also be called a system, a subscriber unit (Subscriber Unit), a subscriber station (Subscriber Station), a mobile station (Mobile Station), a remote station (Remote Station), an access point (Access Point), a remote terminal (Remote Terminal), an access terminal (Access Terminal), a user terminal (User Terminal), a user agent (User Agent), a user device (User Device), or a user equipment (User Equipment).

The foregoing user equipment can support both a short-distance communications technology and a cellular communications technology. In an example where the cellular communications technology is Long Term Evolution (LTE, Long Term Evolution) and the short-distance communications technology is Wireless Fidelity (Wireless-Fidelity, Wi-fi), in a scenario of cooperative communication between multiple users and a single network node, or in a scenario of multi-user cooperative communication (Multiple UEs Cooperative Communication, MUCC), when at least two UEs support both Wi-fi and LTE, in order to increase reliability and throughput, a MUCC relationship may be established between the at least two UEs, that is, when one UE of the at least two UEs needs to send or receive data, another UE except the one UE may provide support and assist the one UE in communication. In the present invention, the one UE is named a benefited device, a served device, a target device, or an assisted device, while the another UE except the one UE is named a supporting device, a serving device, or an assisting device. The foregoing device names are merely examples provided in the present invention, and the device names in the present invention include, but are not limited to, the foregoing name examples.

Using the supporting device and the benefited device as examples, the benefited device is a final sender of uplink data or a final receiver of downlink data (from a perspective of a cellular communications system). For a bearer of the supporting device, generally, there is only one benefited device, while the supporting device is a device used to assist the benefited device and data relay. For a bearer of the benefited device, there may be multiple supporting devices.

Using the supporting device and the benefited device as examples, concepts of the benefited device and the supporting device are viewed from a perspective of the bearer of the benefited device, for example, a device 1 and a device 2 form a MUCC relationship and may assist each other in communication. In this way, from a perspective of a bearer of the device 1, the device 2 may support the bearer of the device 1, and therefore the device 1 is the benefited device while the device 2 is the supporting device. At the same time, the device 1 may also support a bearer of the supporting device 2, and therefore, from a perspective of the bearer of the device 2, the device 2 is the benefited device while the device 1 is the supporting device.

Using the supporting device and the benefited device as examples, when the devices are located within a same short-distance connection range, a network may respectively send downlink data to the supporting device and the benefited device (where an optimized method is that, in network scheduling, a device in a best radio link condition is always selected for sending); when the network sends downlink data to the supporting device, the supporting device receiving the data sends the data to the benefited device through short-distance communication (for example, Wi-fi). Certainly, the data may also reach the benefited device directly, and the benefited device combines the data. Similarly, uplink data of the benefited device may also be sent to the network through the benefited device or another supporting device, and then the network combines the data, completing cooperative communication between devices.

Transmission assisted by the supporting device may increase reliability and throughput of communication of the benefited device.

The base station (for example, an access point) may refer to a device communicating with a wireless terminal over an air interface through one or more sectors on an access network. The base station may be configured to perform conversion between received radio frames and IP packets, and serve as a router between the wireless terminal and other parts of the access network, where the other parts of the access network may include an Internet Protocol (IP) network. The base station may also coordinate attribute management of the air interface. For example, the base station may be a base station (BTS, Base Transceiver Station) in GSM or CDMA, may also be a base station (NodeB) in WCDMA, and may also be an evolved base station (NodeB or eNB or e-NodeB, evolved Node B) in E-UTRA, which is not limited in the present invention.

In this application document, the described "cooperative communication" is a communication mode in which a MUCC relationship may be established between at least two UEs when the at least two UEs support both Wi-fi and LTE, so as to increase reliability and throughput, that is, when one UE of the least two UEs needs to send or receive data, another UE except the one UE may provide support and assist the one UE to perform communication.

To implement cooperative communication, a cooperative layer exists above a PDCP layer and below an application layer, and the cooperative layer is used to split and combine data. A cooperative layer function may be divided into a user plane function and a control plane function.

1. User plane function: including splitting and combining data. That is, an eNB splits and sends downlink data (which is received from a downlink bearer of the benefited device on an S1 interface) to multiple supporting devices, the supporting devices send the data to the benefited device through short-distance communication, and the benefited device combines the data. In the same way, the benefited device splits uplink data, and the eNB combines the data and sends the data to the uplink bearer of the benefited device on the S1 interface.

2. Control plane function: adding a new supporting device and removing an existing supporting device. When an RB link of a supporting device is poor enough, the supporting device is removed. The benefited device performs adaptation according to a short-distance communication link. If short-distance communication is interrupted, the eNB is instructed to cancel the supporting device. If a maximum communication rate of short-distance communication is adjusted, the eNB is notified that a sending rate of a corresponding RB does not exceed the communication rate of short-distance communication.

In this application document, a short-distance communication layer is also mentioned. The short-distance communication layer is a layer below the cooperative layer. For different short-distance communications technologies, the short-distance communication layer is also different, for example, for the Wi-fi technology, the short-distance communication layer includes a MAC layer and a physical PHY layer.

FIG. 1 is a schematic diagram of an application architecture of a data transmission method according to an embodiment of the present invention. In an actual application, the data transmission method according to the embodiment of the present invention, as a new data transmission method, may be applied to a scenario of data transmission between a base station and a benefited device in a mobile communications network system. As shown in FIG. 1, in an application scenario provided by the embodiment of the present invention, a mobility management entity MME may provide a key that is used to provide security protection for data to be transmitted; a base station may split downlink data (which is received from a downlink bearer of a benefited device on an S1 interface) at a cooperative layer, perform encryption and integrity protection on the downlink data by using a cooperative-layer key of the benefited device, and then send the data to one or more supporting devices; the supporting device forwards the data to the benefited device through short-distance communication; and the benefited device performs integrity verification and decryption on the data by using the cooperative-layer key of the benefited device at the cooperative layer, and combines the decrypted data. In the same way, the benefited device may split uplink data at the cooperative layer, perform encryption and integrity protection on the uplink data by using the cooperative-layer key of the benefited device, and then send the data to one or more supporting devices; the supporting device forwards the data to the base station through short-distance communication; and the base station performs integrity verification and decryption on the data by using the cooperative-layer key of the benefited device at the cooperative layer, and combines the decrypted data. Because the supporting device does not know the cooperative-layer key of the benefited device, it can be ensured that the data transmitted between the base station and the benefited device is secure. In addition, during data transmission between the supporting device and the benefited device, encryption and integrity protection processing may also be performed at a short-distance communication layer for data to be transmitted, so as to ensure secure data transmission between the supporting device and the benefited device.

Figure 2:
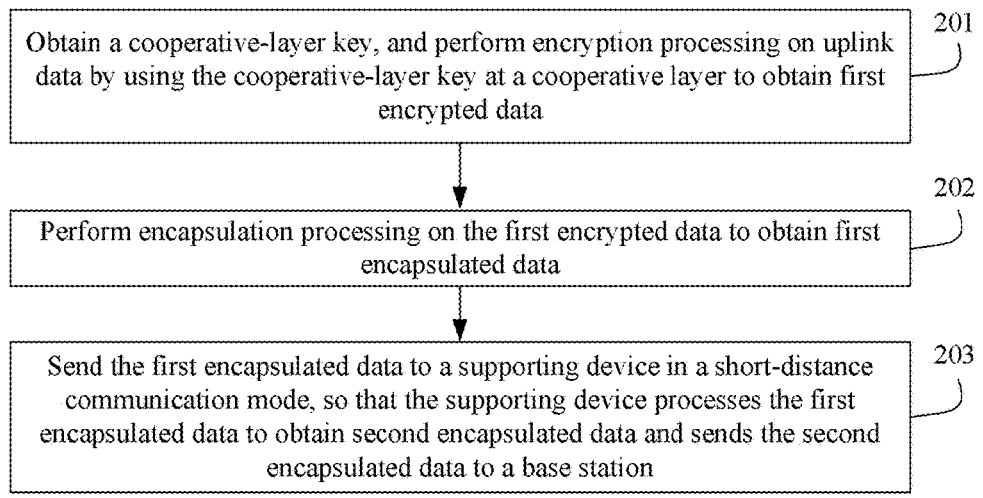
FIG. 2 is a flowchart of a data transmission method according to an embodiment of the present invention.

FIG. 2 is a flowchart of a data transmission method according to an embodiment of the present invention. This embodiment is executed by a benefited device, and a process in which the benefited device performs encryption, or encryption and integrity protection on uplink data to be sent to a base station, and sends the data through a supporting device is described in detail. As shown in FIG. 2, this embodiment includes the following steps:

Step 201: A benefited device obtains a cooperative-layer key, and performs encryption, or encryption and integrity protection on uplink data by using the cooperative-layer key at a cooperative layer to obtain first encrypted data.

Specifically, after the benefited device and a mobility management entity (Mobility Management Entity, MME) complete an evolved packet system authentication and key agreement process (Evolved Packet System Authentication and Key Agreement, EPS AKA) process, a parent key Kasme is obtained. Then, the cooperative-layer key may be generated by using two methods: one method is that the MME generates the cooperative-layer key according to a key derivation function KDF( ) and Kasme, and the other method is that a base station generates the cooperative-layer key according to a base station side key or an access-stratum key. The cooperative-layer key includes encryption keys Int-layer_UPenc and Int-layer_CPenc, and integrity keys Int-layer_Upint and Int-layer_CPint. The encryption key Int-layer_UPenc is used to encrypt user plane data at the cooperative layer, the encryption key Int-layer_CPenc is used to encrypt control plane data at the cooperative layer, the integrity key Int-layer_Upint is used to protect integrity of the user plane data at the cooperative layer, and the integrity key Int-layer_CPint is used to protect integrity of the control plane data at the cooperative layer.

If data to be transmitted is user plane data, integrity protection may not be performed on the data, but only encryption processing is performed. Certainly, both encryption processing and integrity protection may be performed; if data to be transmitted is control plane data, both encryption processing and integrity protection are performed.

Step 202: Perform encapsulation processing on the first encrypted data to obtain first encapsulated data.

After performing, at the cooperative layer, encryption, or encryption and integrity protection on the data to be transmitted, the benefited device performs cooperative-layer encapsulation on the data, and then performs corresponding encapsulation processing on the data at a short-distance communication layer to obtain the first encapsulated data.

It should be noted that, at the short-distance communication layer, encryption processing and integrity protection processing may also be performed on the data that is obtained through encapsulation at the cooperative layer, so as to prevent an attacker from performing, through a radio air interface between a supporting device and the benefited device, security attacks such as eavesdropping, modification, and replay on the data to be transmitted, and ensure confidentiality and integrity of the data transmitted between the supporting device and the benefited device.

Step 203: Send the first encapsulated data to a supporting device in a short-distance communication mode, so that the supporting device processes the first encapsulated data to obtain second encapsulated data and sends the second encapsulated data to a base station.

After encapsulation is performed on the data at the short-distance communication layer, the first encapsulated data may be sent to the supporting device in the short-distance communication mode, such as a cellular communication mode, or a wireless fidelity Wi-fi mode, or a Bluetooth mode, or an device-to-device D2D mode, or a near field communication NFC mode.

After receiving the data at the short-distance communication layer, the supporting device performs decapsulation processing on the data. If the benefited device performs security protection on the data at the short-distance communication layer, namely, encryption and integrity protection, after receiving the data, the supporting device performs verification and decryption processing on the data by using a short-distance-communication-layer key, performs bearer mapping and cooperative-layer encapsulation on the data at the cooperative layer, performs integrity protection and encryption processing by using a PDCP-layer key of the supporting device at a PDCP layer, performs layer-by-layer encapsulation downwards, and then sends the data to the base station.

Figure 3:
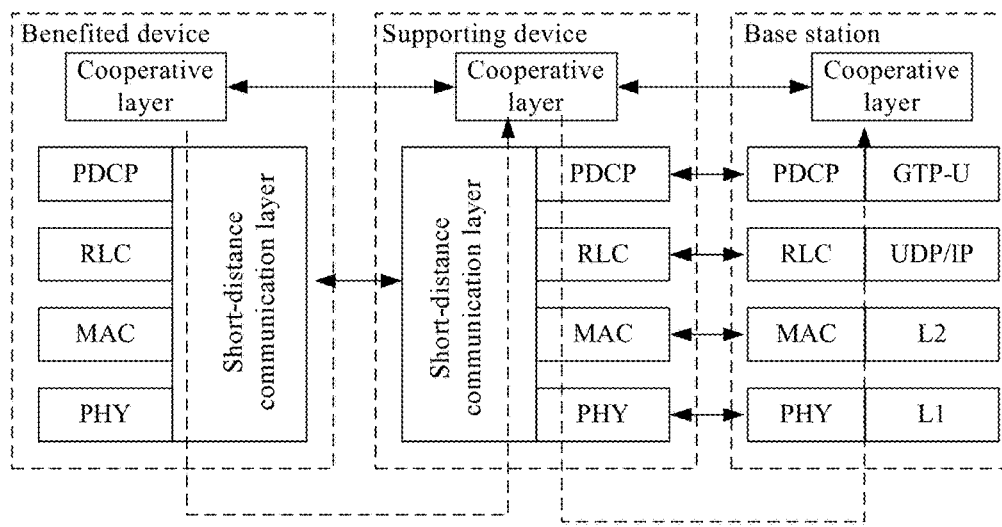
FIG. 3 is a schematic diagram of a data stream for sending data to a base station by a benefited device through a supporting device according to an embodiment of the present invention.

Specifically, a data stream for sending data to a base station by a benefited device through a supporting device is shown in broken lines in FIG. 3. Encryption processing is performed on the data at a cooperative layer, and then the data is transmitted to a short-distance communication layer; after encapsulation processing is performed on the data at the short-distance communication layer, the data is transmitted to the short-distance communication layer of the supporting device in a short-distance communication mode; after decapsulation is performed on the data at the short-distance communication layer, the data is transmitted to the cooperative layer of the supporting device, and after processing, such as bearer mapping, is performed on the data at the cooperative layer, the data is transmitted to a PDCP layer, and after integrity protection and encryption processing are performed by using a PDCP-layer key of the supporting device at the PDCP layer, layer-by-layer encapsulation is performed downwards, and then the data is sent to the base station; after receiving the data, the base station performs layer-by-layer decapsulation upwards, performs integrity verification and decryption by using the PDCP-layer key of the supporting device at the PDCP layer, transmits the data to the cooperative layer, performs integrity verification and decryption by using the cooperative-layer key of the benefited device at the cooperative layer, and finally obtains the data sent by the benefited device.

The foregoing briefly describes a method in which a benefited device sends data to a base station through a supporting device, and a method in which a base station sends data to a benefited device through a supporting device is similar to the foregoing method. That is, the method in which a base station sends data to a benefited device through a supporting device is as follows: A base station performs cooperative-layer protection at a cooperative layer on data to be sent, performs protection by using a PDCP-layer key of a supporting device at a PDCP layer, and then sends the data to the supporting device; after receiving the data, the supporting device performs decryption, or integrity verification and decryption by using the PDCP-layer key at the PDCP layer, and after processing is performed at the cooperative layer, transmits the data to a short-distance communication layer, and after protection is performed at the short-distance communication layer, sends the data to a benefited device; the benefited device receives the data that is sent by the supporting device in a short-distance communication mode, performs integrity verification and decryption by using a short-distance-communication-layer key, and then performs decryption, or decryption and integrity verification processing on the data by using a cooperative-layer key to obtain decrypted data. In this way, secure data transmission between the benefited device, the supporting device, and the base station is implemented in a cooperative communication process, and network security and reliability of data transmission are improved.

In the embodiment of the present invention, a process in which a benefited device transmits data to a base station through a supporting device is described. A benefited device obtains a cooperative-layer key, performs encryption, or encryption and integrity protection processing on uplink data by using the cooperative-layer key at a cooperative layer to obtain first encrypted data, performs encapsulation processing on the first encrypted data to obtain first encapsulated data, and sends the first encapsulated data to a supporting device in a short-distance communication mode, so that the supporting device processes the first encapsulated data to obtain second encapsulated data and sends the second encapsulated data to a base station. In this way, a problem that in a cooperative communication process, data transmitted between the benefited device and the base station through the supporting device is obtained by the supporting device or eavesdropped and tampered by another device, is avoided. In the present invention, when a sender (the benefited device or the base station) sends data, a key unknown to the supporting device is used to perform encryption and integrity protection on the data at a cooperative layer, so that the supporting device cannot obtain the data; in addition, encryption and integrity protection are performed on the data at a short-distance communication layer, so that the data is not eavesdropped and tampered by another user equipment when the data is transmitted in the short-distance communication mode between the supporting device and the benefited device, thereby implementing secure data transmission between the benefited device, the supporting device, and the base station in the cooperative communication process, and improving network security and reliability of data transmission In the foregoing embodiment, a data transmission method is described, where a cooperative-layer key is used in a data transmission process, which ensures that the data of the benefited device is not decrypted and obtained by the supporting device; a short-distance-communication-layer key is also provided, which can prevent an attacker from performing, through a radio air interface between the supporting device and the benefited device, security attacks such as eavesdropping, modification, and replay on data to be transmitted, and ensure confidentiality and integrity of the data transmitted between the supporting device and the benefited device. The following embodiment describes a method for generating a cooperative-layer key and a method for generating a short-distance-communication-layer key.

A cooperative-layer key may be generated on an MME, and may also be generated on a base station. After the cooperative-layer key is generated, negotiation about a cooperative-layer encryption algorithm used for cooperative-layer encryption and a cooperative-layer integrity protection algorithm may also be performed between a benefited device and the base station to obtain the cooperative-layer encryption algorithm and the cooperative-layer integrity protection algorithm that are to be used.

If algorithm information needs to be entered when the cooperative-layer key is calculated, algorithm negotiation should be performed before calculation of the cooperative-layer key; otherwise, a cooperative-layer encryption algorithm may be obtained before or after the calculation of the cooperative-layer key.

The method for generating a cooperative-layer key on the MME is as follows: After EPS AKA is completed by the benefited device and the MME, a parent key Kasme is obtained. A key may be generated by using the parent key as an input of a KDF, where the key is a cooperative-layer key.

Specifically, KDF( ) is a key derivation function, KDF( ) in the 3$^{rd}$ Generation Partnership Project (The 3$^{rd}$ Generation Partnership Project, 3GPP) is a function HMAC-sha-256( ), and a cooperative-layer key is HMAC-SHA-256 (Key, S), where, Key is Kasme, and S=FC||P0||L0||P1||L1||P2||L2||P3||L3|| . . . ||Pn||Ln, P0, L0 . . . , which are optional, where, FC is 0x15, P0 is an algorithm type distinguisher (an encryption algorithm indicator or an integrity protection algorithm indicator), L0 is the length of the algorithm type distinguisher (the length of the encryption algorithm indicator or the integrity protection algorithm indicator), P1 is an algorithm identity (identity information of an encryption algorithm or an integrity protection algorithm), and L1 is the length of the algorithm identity (the length of the identity information of the encryption algorithm or the integrity protection algorithm). Optionally, a cooperative-layer key may also be generated by entering another parameter in KDF( ), as long as the benefited device properly negotiates with the MME.

Figure 4:
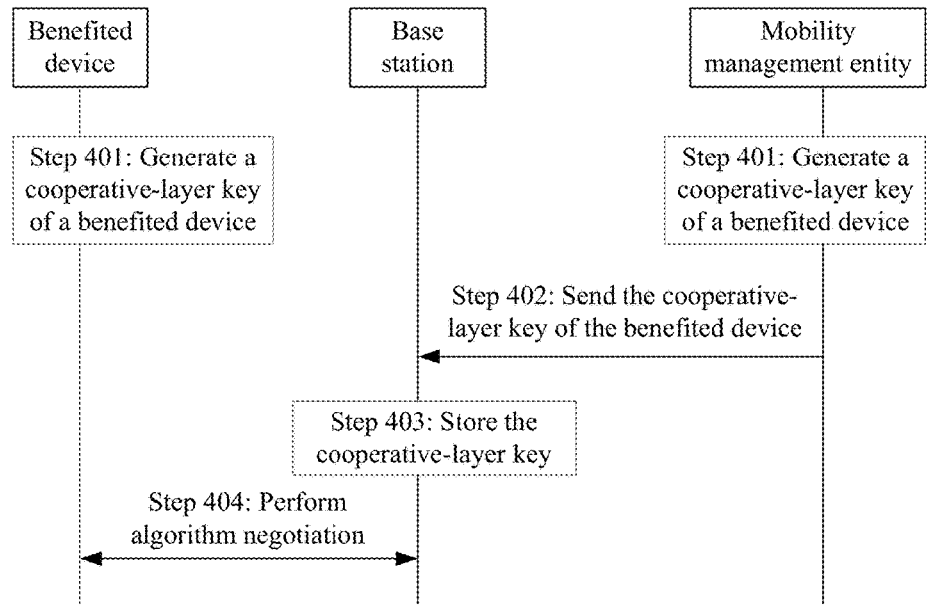
FIG. 4 is a schematic diagram of information exchange for obtaining a cooperative-layer key by a UE and an MME according to an embodiment of the present invention.

Preferably, a cooperative-layer key may also be generated by a UE and an MME. FIG. 4 is a schematic diagram of information exchange for obtaining a cooperative-layer key by an MME according to an embodiment of the present invention. A process in which a network side generates a cooperative-layer key and sends the cooperative-layer key to a base station, and the base station notifies a benefited device is described in detail, and as shown in FIG. 4, this embodiment includes the following steps:

Step 401: After EPS AKA is completed by a benefited device and a mobility management entity MME to obtain Kasme, the MME generates, according to a key derivation function KDF( ), a cooperative-layer key of a benefited device, including an encryption key (Int-layer_UPenc, Int-layer_CPenc) and an integrity protection key (Int-layer_UPint, Int-layer_CPint).

When the benefited device initiates a MUCC service, a supporting device capable of supporting the MUCC service is discovered first, and a network side performs security authentication on identities of the supporting device and the benefited device, respectively.

Step 402: The MME sends the cooperative-layer key of the benefited device to a base station.

Step 403: The base station stores the cooperative-layer key of the benefited device.

Step 404: The benefited device and the base station negotiate an algorithm, including an encryption algorithm and an integrity protection algorithm (where the algorithm may be an AS-layer encryption algorithm negotiated through an AS SMC process of a direct link between the benefited device and the base station, and may also be a new algorithm different from the AS-layer encryption algorithm and negotiated through the direct link between the benefited device and the base station).

Figure 5:
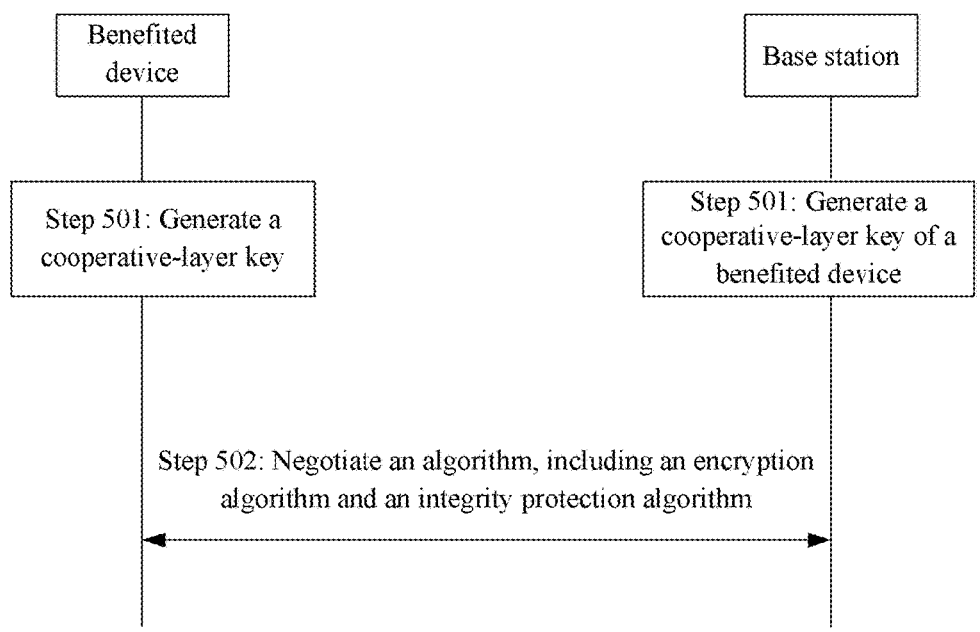
FIG. 5 is a schematic diagram of information exchange for obtaining a cooperative-layer key by a benefited UE and a base station according to an embodiment of the present invention.

Preferably, the cooperative-layer key may also be generated on the base station, a process of which is shown in FIG. 5. FIG. 5 is a schematic diagram of information exchange for obtaining a cooperative-layer key by a benefited UE and a base station according to an embodiment of the present invention, and as shown in FIG. 5, this embodiment includes the following steps:

Step 501: A base station generates a cooperative-layer key.

Specifically, the base station may generate the cooperative-layer key by using a base station side key KeNB or an access-stratum key as an input of a key derivation function KDF( ).

After EPS AKA is completed by a benefited device and an MME to obtain a parent key Kasme, the MME generates KeNB according to Kasme, and sends KeNB to the base station. The MME may generate the key KeNB, namely, a base station side key by using the parent key and a non access stratum communication security protection count NAS UPLINK COUNT as an input of KDF( ), and send KeNB to the base station. An access-stratum key may be generated according to the base station side key. In this way, the base station may generate the cooperative-layer key according to the base station side key or the access-stratum key.

Step 502: The base station and the benefited device perform algorithm negotiation.

After the cooperative-layer key is generated, negotiation about an encryption algorithm or an integrity protection algorithm may be performed between the base station and the benefited device.

In this way, in the embodiment of the present invention, a process in which the base station generates the cooperative-layer key is implemented.

Preferably, the cooperative-layer key may also be obtained by derivation according to a D-H private key delivered by a network side. Specifically, which method is used to generate the cooperative-layer key may be decided through agreement by the benefited device and the network side. Correspondingly, for a short-distance-communication-layer key, a D-H key agreement technology may also be used to generate the short-distance-communication-layer key, so as to protect security of short-distance communication.

The short-distance-communication-layer key may be generated by the MME and delivered to a supporting device and the benefited device; may also be generated through agreement by the supporting device and the benefited device, without involvement of the network side (including the base station, the MME, and so on); may also be generated by the benefited device according to a key generator and sent to the supporting device through the network side; may also be generated through joint negotiation by the supporting device, the benefited device, and the network side; and may also be generated by the benefited device and delivered to the supporting device through the MME and the base station. After the short-distance-communication-layer key is generated, negotiation about a short-distance-communication-layer encryption algorithm used for short-distance-communication-layer encryption and a short-distance-communication-layer integrity protection algorithm may also be performed between the benefited device and the supporting device to obtain the short-distance-communication-layer encryption algorithm and the short-distance-communication-layer integrity protection algorithm that are to be used.

Figure 6:
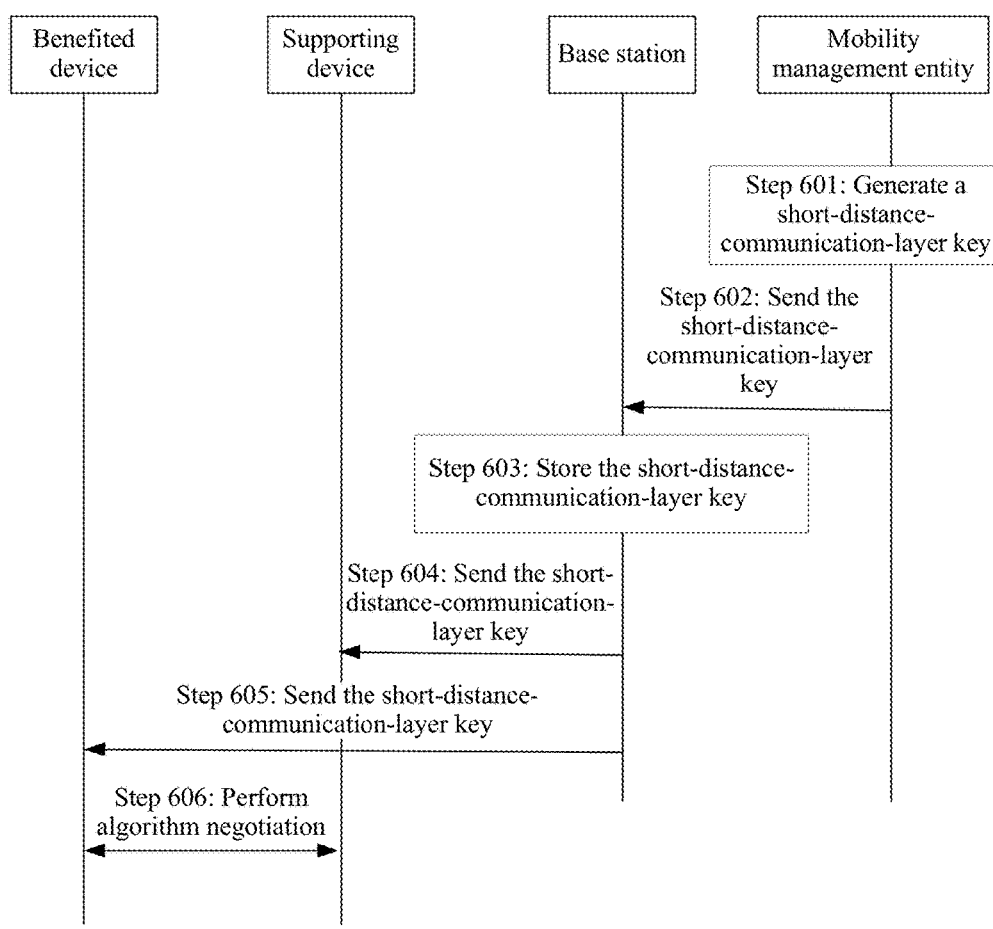
FIG. 6 is a schematic diagram of information exchange for generating a short-distance-communication-layer key and sending the short-distance-communication-layer key to a supporting device and a benefited device by an MME according to an embodiment of the present invention.

Specifically, the short-distance-communication-layer key may be generated by the MME and delivered to the supporting device and the benefited device. FIG. 6 is a schematic diagram of information exchange for generating a short-distance-communication-layer key and sending the short-distance-communication-layer key to a supporting device and a benefited device by an MME according to an embodiment of the present invention, and as shown in FIG. 6, this embodiment includes the following steps:

Step 601: An MME generates a short-distance-communication-layer key.

When a benefited device decides to initiate a MUCC service, an operation of discovering a supporting device around capable of supporting the MUCC service is first executed, and security authentication between the benefited device and the supporting device is completed. The process may be implemented by the benefited device and the supporting device, without involvement of a base station, and may also be jointly implemented by the base station, the benefited device, and the supporting device.

Before the short-distance-communication-layer key is generated, the benefited device and the network side (the MME/base station) may complete negotiation about a cooperative-layer key and an algorithm.

An operation of generating the short-distance-communication-layer key by the MME is specifically as follows: randomly generating a random number Random, and generating a short-distance-communication-layer key HMAC-SHA-256 (Random, B-UE ID, S-UE ID) by using the Random value, identity information of the supporting device, and identity information of the benefited device as inputs of KDF( ) parameters.

Step 602: The MME sends the short-distance-communication-layer key to the base station.

The MME first protects the short-distance-communication-layer key by using a NAS-layer encryption key and a NAS-layer integrity protection key of the benefited device and the supporting device, respectively, and then delivers the short-distance-communication-layer key to the base station.

Step 603: The base station stores the short-distance-communication-layer key.

Step 604: The base station sends the short-distance-communication-layer key to the supporting device.

After encrypting the short-distance-communication-layer key by using a PDCP-layer key (an RRC encryption key and an RRC integrity protection key) of the supporting device, the base station sends the short-distance-communication-layer key to the supporting device by using RRC signaling.

Step 605: The base station sends the short-distance-communication-layer key to the benefited device.

After encrypting the short-distance-communication-layer key by using a PDCP-layer key (an RRC encryption key and an RRC integrity protection key) of the benefited device, the base station sends the short-distance-communication-layer key to the benefited device by using RRC signaling.

Step 606: The benefited device and the supporting device complete negotiation about short-distance-communication-layer algorithms.

The short-distance layer encryption or integrity protection algorithms of the supporting device and the benefited device may also be indicated by the base station to the supporting device and the benefited device, respectively. In this way, algorithm negotiation in step 606 may be omitted.

In the embodiment of the present device, protection is performed by using a NAS-layer key and a PDCP-layer key of the supporting device when the network side delivers the short-distance-communication-layer key to the supporting device, and protection is performed by using a NAS-layer key and a PDCP-layer key of the benefited device when the network side delivers the short-distance-communication-layer key to the benefited device, thereby ensuring that the short-distance-communication-layer key is not eavesdropped and tampered by another user, and ensuring integrity and confidentiality of the short-distance-communication-layer key.

Figure 7:
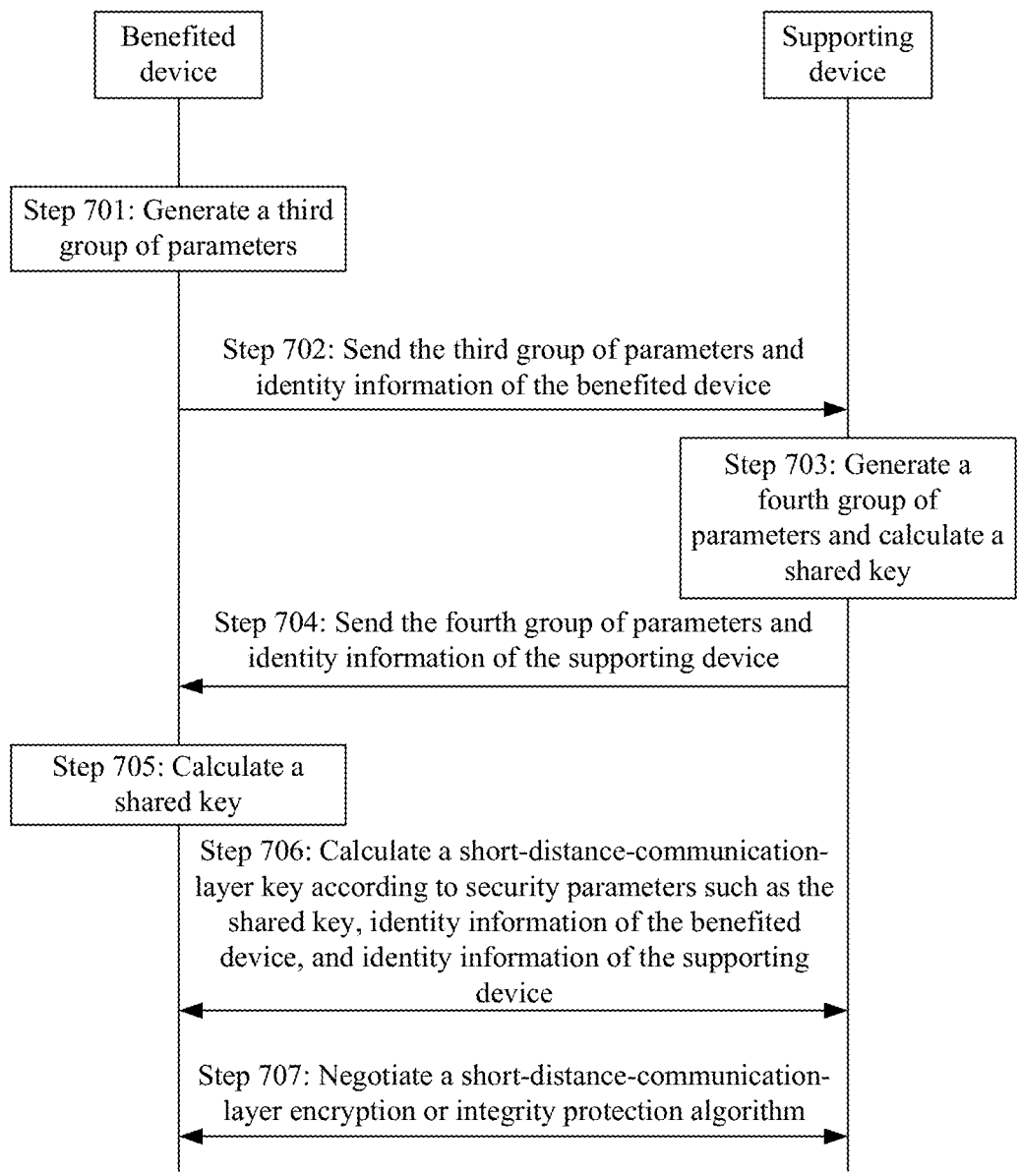
FIG. 7 is a schematic diagram of information exchange for generating, through agreement, a short-distance-communication-layer key by a supporting device and a benefited device according to an embodiment of the present invention.

Specifically, a method in which the short-distance-communication-layer key is generated through agreement by the supporting device and the benefited device, without involvement of the network side, may be a D-H mode, or a key matching mode, or a shared key mode, or a null encryption mode, or another similar key agreement mode. The D-H mode is used as an example for description herein. FIG. 7 is a schematic diagram of information exchange for generating, through agreement, a short-distance-communication-layer key by a supporting device and a benefited device according to an embodiment of the present invention, and as shown in FIG. 7, this embodiment includes the following steps:

Step 701: A benefited device generates a third group of parameters.

When the benefited device decides to initiate a MUCC service, an operation of discovering a supporting device around capable of supporting the MUCC service is executed, and security authentication between the benefited device and the supporting device is completed. The process may be implemented by the benefited device and the supporting device, without involvement of a base station, and may also be jointly implemented by the base station, the benefited device, and the supporting device.

The benefited device generates the third group of parameters, namely, a D-H private key a, and public numbers p and g, and calculates $A=(g^a)$ mod p.

Step 702: The benefited device sends the third group of parameters and an identity of the benefited device to the supporting device.

Step 703: The supporting device generates a fourth group of parameters.

The fourth group of parameters generated by the supporting device includes a private key b, and $B=(g^b)$ mod p.

After receiving the third group of parameters sent by the benefited device, the supporting device calculates a shared key: share key=$(A^b)$ mod p.

Step 704: The supporting device sends the fourth group of parameters and an identity of the supporting device to the benefited device.

Step 705: The benefited device calculates a shared key.

After receiving the fourth group of parameters and identity information of the supporting device, the benefited device may calculate the shared key: share key=(B^a) mod p.

Step 706: The benefited device and the supporting device calculate a short-distance-communication-layer key according to security parameters such as the shared key share key, the identity of the benefited device, and the identity of the supporting device.

Step 707: The benefited device and the supporting device negotiate a short-distance-communication-layer encryption or integrity protection algorithm.

In the embodiment of the present invention, the benefited device and the supporting device obtain the short-distance-communication-layer key in a D-H agreement mode.

Optionally, in a key matching mode, the benefited device may generate a random number as an input key/parameter, and notify the supporting device of the random number in a mode (using an oral notification, a short message notification, a mail notification, and so on). In this way, both sides have a same input key/parameter, and therefore can further negotiate the short-distance-communication-layer key. This mode is applicable to scenarios such as an office, a home, and a school.

Optionally, in a shared key mode, a shared key is preconfigured between the benefited device and the supporting device, and each time a cooperative communication service is performed, the benefited device and the supporting device agree upon a short-distance-communication-layer key according to the shared key. This mode is applicable to scenarios such as an office, a home, and a school.

Optionally, in a null encryption mode, after the benefited device and the supporting device complete a discovery and authentication process, the supporting device indicates the null encryption mode to the benefited device, and if the benefited device supports the null encryption mode, the benefited device returns a confirmation message. In this way, cooperative communication security only relies on cooperative-layer security negotiated by the benefited device and the network side, and no special protection is performed on short-distance communication.

Figure 8:
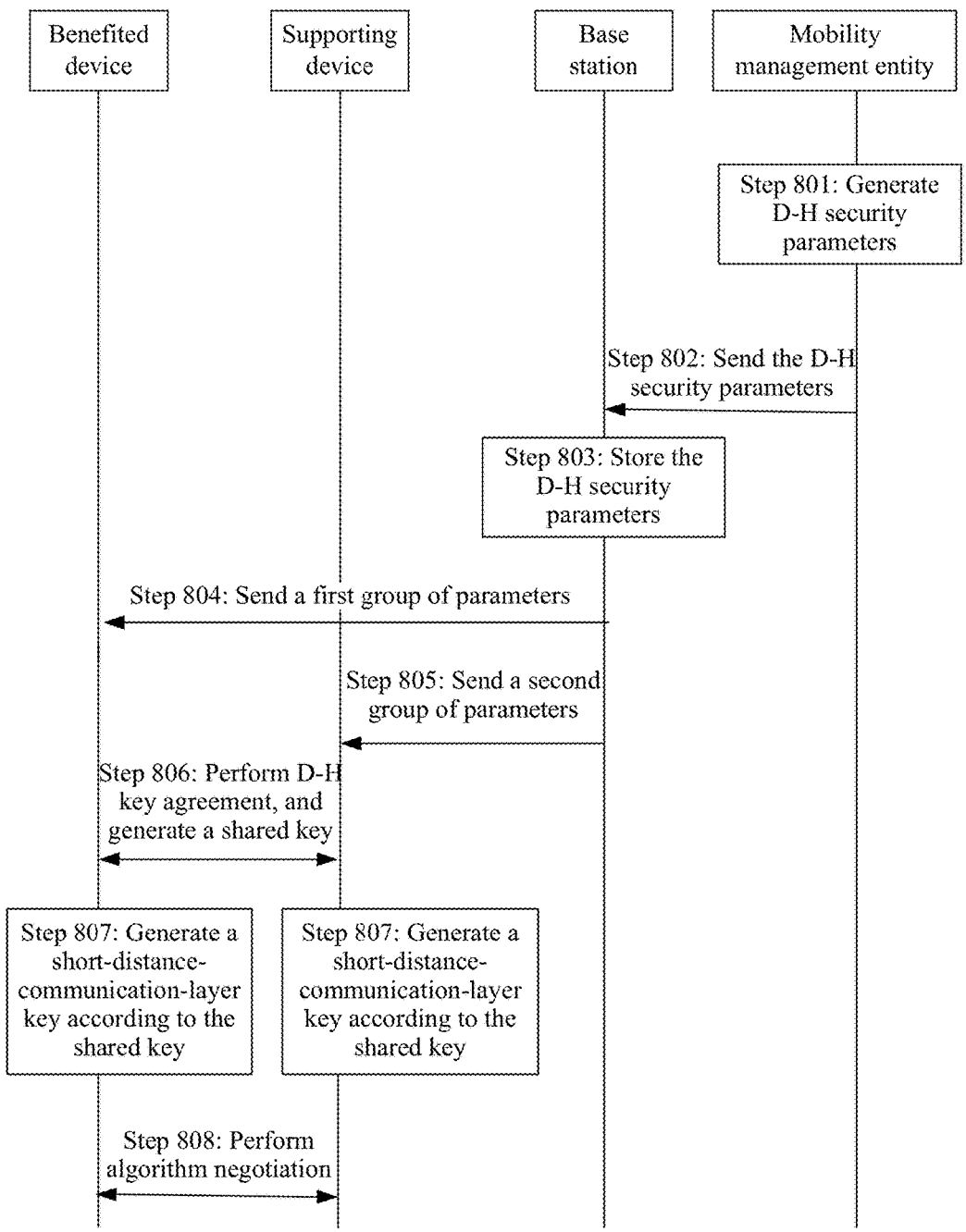
FIG. 8 is a schematic diagram of information exchange for generating, through agreement, a short-distance-communication-layer key by an MME, a supporting device, and a benefited device according to an embodiment of the present invention.

Specifically, the short-distance-communication-layer key may also be jointly generated by the supporting device, the benefited device, and the network side. FIG. 8 is a schematic diagram of information exchange for generating, through agreement, a short-distance-communication-layer key by an MME, a supporting device, and a benefited device according to an embodiment of the present invention, and as shown in FIG. 8, this embodiment includes the following steps:

Step 801: An MME generates D-H security parameters.

D-H security parameters include DH_a and DH_b, and public numbers g and p.

The MME generates the D-H security parameters, including private keys DH_a (a private key of a benefited device) and DH_b (a private key of a supporting device), and public numbers g and q.

Step 802: The MME sends the D-H security parameters to a base station.

Step 803: The base station saves the D-H security parameters.

Step 804: The base station sends a first group of parameters to the benefited device.

The base station sends the first group of parameters, namely, the private key DH_a of the benefited device, and public numbers g and q to the benefited device (which is protected by an EPS security mechanism of the benefited device).

Step 805: The base station sends a second group of parameters to the supporting device.

The base station sends the second group of parameters, namely, the private key DH_b of the supporting device), and public numbers g and q to the supporting device (which is protected by an EPS security mechanism of the supporting device).

Step 806: The supporting device and the benefited device perform D-H key agreement, and generate a shared key Key-DH.

During a D-H key agreement process performed by the supporting device and the benefited device, the benefited device calculates $A=(g^{DH\_a})$ mod (p), and sends A to the supporting device, and the supporting device obtains Key_DH=$(A^{DH\_b})$ mod (p) according to A and the saved DH_b, g, and p; similarly, the supporting device calculates $B=(g^{DH\_b})$ mod (p), and sends B to the benefited device, and the benefited device obtains Key_DH=$(B^{DH\_b}$ mod (p) according to B and the saved DH_a, g, and p.

It should be noted that, different from a traditional D-H process, public numbers g and p herein are not transmitted between the benefited device and the supporting device through an air interface, that is, g and p will not be obtained by an attacker; therefore, after A and B are exchanged between the benefited device and the supporting device, only the benefited device and the supporting device that have the same g and p can agree upon a same public key Key_DH, and legal identities of both sides are also authenticated; the attacker cannot calculate correct A, B, and Key_DH because the attacker does not have correct g and p, and in this way, an illegal identity of the benefited device or the supporting device is authenticated.

Step 807: The supporting device generates, according to the Key_DH, a key used for short-distance communication, including an encryption key and an integrity protection key, and the benefited device generates, according to the Key_DH, a key used for short-distance communication, including an encryption key and an integrity protection key.

Step 808: The supporting device and the benefited device negotiate an algorithm, including an encryption algorithm and an integrity protection algorithm.

In the embodiment of the present invention, a network side, the benefited device, and the supporting device obtain the short-distance-communication-layer key in a D-H agreement mode.

Figure 9:
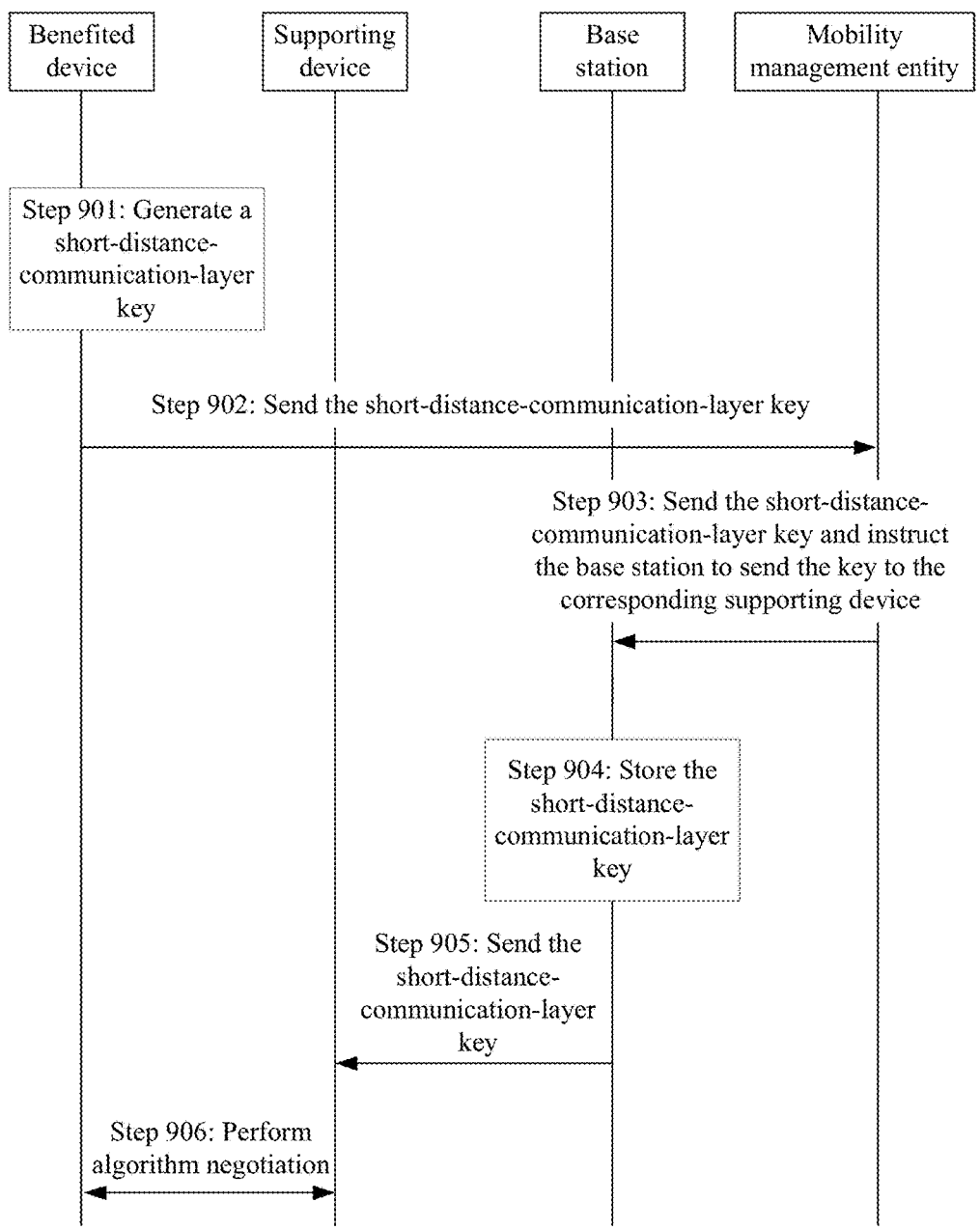
FIG. 9 is a schematic diagram of information exchange for generating a short-distance-communication-layer key by a benefited device according to an embodiment of the present invention.

Specifically, the short-distance-communication-layer key may also be generated by the benefited device. FIG. 9 is a schematic diagram of information exchange for generating a short-distance-communication-layer key by a benefited device according to an embodiment of the present invention, and as shown in FIG. 9, this embodiment includes the following steps:

Step 901: A benefited device generates a short-distance-communication-layer key.

When the benefited device decides to initiate a MUCC service, an operation of discovering a supporting device around capable of supporting the MUCC service is first executed, and security authentication between the benefited device and the supporting device is completed. The process may be implemented by the benefited device and the supporting device, without involvement of a network side (a base station or an MME), and may also be jointly implemented by the network side, the benefited device, and the supporting device.

Before the short-distance-communication-layer key is generated, an operation of generating a cooperative-layer key may be first executed.

Step 902: The benefited device sends the short-distance-communication-layer key to the MME.

Step 903: The MME sends the short-distance-communication-layer key generated by the benefited device to the base station, and instructs the base station to send the key to the corresponding supporting device.

The MME may protect, by using NAS security context, the key generated by the benefited device.

Step 904: The base station saves the short-distance-communication-layer key.

Step 905: The base station sends the short-distance-communication-layer key to the supporting device.

The short-distance-communication-layer key may be encrypted by using a PDCP-layer key of the supporting device, and then the encrypted short-distance-communication-layer key is sent to the supporting device.

Step 906: The benefited device and the supporting device complete negotiation about short-distance-communication-layer algorithms.

In the embodiment of the present invention, the benefited device generates a short-distance-communication-layer key and sends the short-distance-communication-layer key to the supporting device.

The foregoing briefly describes a method for generating a cooperative-layer key and a short-distance-communication-layer key that are used during a data transmission process in the embodiment of the present invention. The methods described in the foregoing are merely a part of specific implementation manners of the present invention, but are not intended to limit the protection scope of the present invention. A manner of generating a cooperative-layer key or a short-distance-communication-layer key according to the foregoing methods or in combination with the foregoing methods should fall within the protection scope of the present invention.

Figure 10:
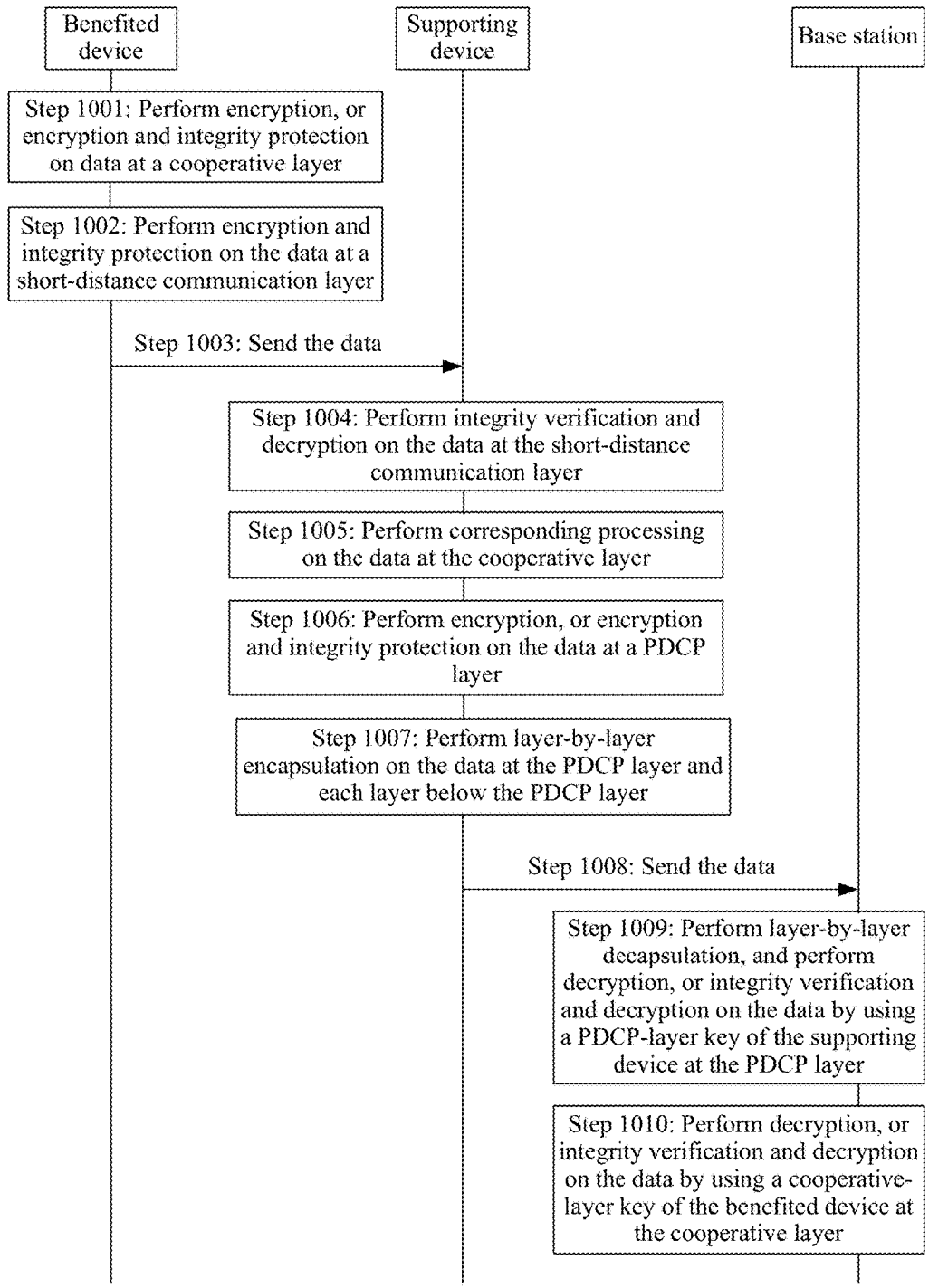
FIG. 10 is a schematic diagram of data transmission with a base station performed by a benefited device through a supporting device according to an embodiment of the present invention.

The following describes a process in which a benefited device performs data transmission with a base station through a supporting device in detail. FIG. 10 is a schematic diagram of data transmission with a base station performed by a benefited device through a supporting device according to an embodiment of the present invention, where a data transmission method is described in the embodiment of the present invention by using a process of transmitting data by a benefited device to a base station through a supporting device as an example, and as shown in FIG. 10, this embodiment includes the following steps:

Step 1001: A benefited device performs, at a cooperative layer, encryption and integrity protection on data to be transmitted.

After receiving, from a radio bearer (Radio Bearer, RB), the data to be transmitted, the benefited device transmits the data to the cooperative layer and performs encryption and integrity protection on the data at the cooperative layer. If the data to be transmitted is user plane data, integrity protection may not be performed on the data, but only encryption processing is performed. Certainly, both encryption processing and integrity protection may be performed; if the data to be transmitted is control plane data, both encryption processing and integrity protection are performed.

After performing encryption on the data at the cooperative layer, the benefited device may add header information of the cooperative layer, where the header information may include a data sequence number, so that a peer end combines the data according to the data sequence number after receiving the data. After the header information of the cooperative layer is added, the data is transmitted to a short-distance communication layer.

Step 1002: The benefited device performs, at the short-distance communication layer, short-distance-communication-layer encryption and integrity protection on the data transmitted from the cooperative layer.

The benefited device and a supporting device perform communication through a short-distance communication technology. Because a radio air interface between the benefited device and the supporting device is vulnerable to an attack on the air interface by an attacker, encryption and integrity protection may be performed on the data at the short-distance communication layer.

Step 1003: The benefited device transmits the data encrypted at the short-distance communication layer to the supporting device in a short-distance communication mode.

The short-distance communication mode may be a cellular communication mode, or a wireless fidelity Wi-fi mode, or a Bluetooth mode, or an device-to-device D2D mode, or a near field communication NFC mode.

Step 1004: The supporting device performs decryption and integrity verification on the received data at the short-distance communication layer.

After receiving the data sent by the benefited device, the supporting device decapsulates the data, performs integrity verification on the decapsulated data at the short-distance communication layer, performs decryption on the decapsulated data, and then transmits the decrypted data to the cooperative layer.

Step 1005: The supporting device performs, at the cooperative layer, corresponding processing on the data transmitted from the short-distance communication layer.

After receiving the data, the cooperative layer of the supporting device may perform bearer mapping on the data; if cooperative-layer header information of the data includes a data sequence number, the cooperative layer of the supporting device may also perform bearer mapping of the data according to the data sequence number, that is, a short-distance bearer between the benefited device and the supporting device is mapped to a radio bearer between the supporting device and a base station, and when forwarding the data to the base station, the cooperative layer of the supporting device may perform cooperative-layer encapsulation on the data, and then deliver the data to a PDCP layer.

Step 1006: The supporting device performs, by using a PDCP-layer key of the supporting device at a PDCP layer, encryption, or encryption and integrity protection on the data transmitted from the cooperative layer.

For user plane data, no integrity protection is performed at the PDCP layer, but only encryption processing is performed. For control plane data, both encryption processing and integrity protection are performed at the PDCP layer.

Step 1007: The supporting device performs layer-by-layer encapsulation on the data at the PDCP layer and each layer below the PDCP layer.

At the PDCP layer, integrity protection and encryption processing are performed by using the PDCP-layer key of the supporting device, and then PDCP-layer encapsulation, RLC-layer encapsulation, MAC-layer encapsulation, PHY-layer encapsulation, and so on are performed.

Step 1008: The supporting device sends the data to the base station.

The supporting device may send the data to the base station through a link between the base station and the supporting device.

Step 1009: The base station performs layer-by-layer decapsulation upwards on the received data, and performs decryption, or integrity verification and decryption on the data by using the PDCP-layer key of the supporting device at the PDCP layer.

Step 1010: The base station performs decryption, or integrity verification and decryption on the data by using a cooperative-layer key of the benefited device at the cooperative layer.

The base station performs decryption, or integrity verification and decryption on the data by using the cooperative-layer key of the benefited device, to obtain the data sent by the benefited device.

The embodiment of the present invention describes a method in which a benefited device sends data to a base station through a supporting device. Through cooperative-layer protection and short-distance-communication-layer protection on data to be transmitted, secure data transmission between the benefited device, the supporting device, and the base station is implemented in a cooperative communication process in the embodiment of the present invention, and network security and reliability of data transmission are ensured.

Figure 11:
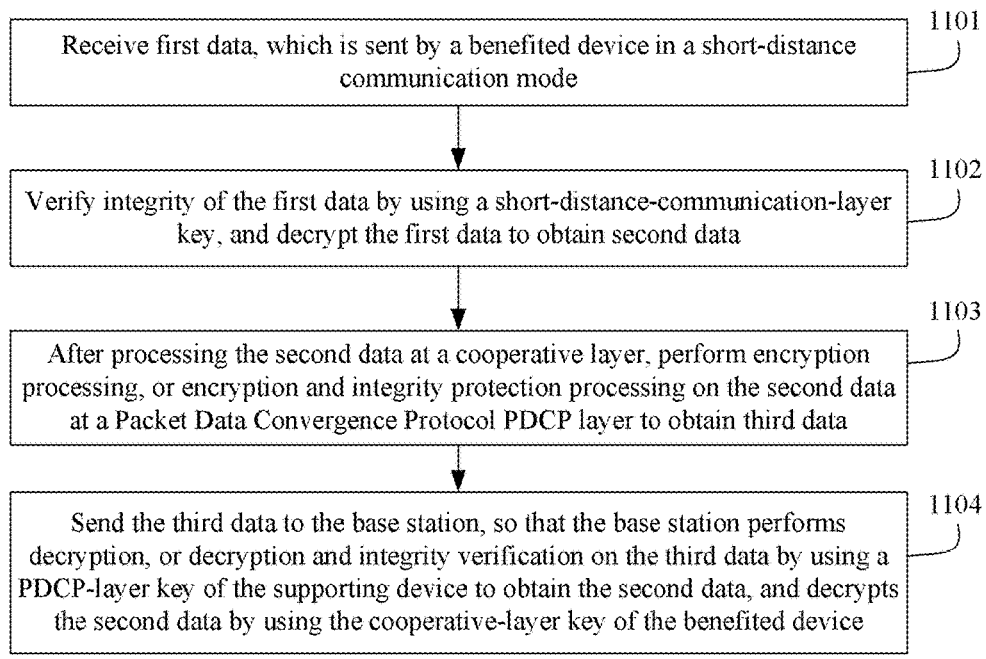
FIG. 11 is a flowchart of another data transmission method according to an embodiment of the present invention.

The foregoing embodiment describes a method in which a benefited device sends data to a base station through a supporting device, and a method in which a base station sends data to a benefited device through a supporting device is similar to the foregoing method. That is, the method in which a base station sends data to a benefited device through a supporting device is as follows: A base station performs cooperative-layer protection at a cooperative layer on data to be sent, performs protection by using a PDCP-layer key of a supporting device at a PDCP layer, and then sends the data to the supporting device; after receiving the data, the supporting device performs decryption, or integrity verification and decryption by using the PDCP-layer key at the PDCP layer, and after processing is performed at the cooperative layer, transmits the data to a short-distance communication layer, and after protection is performed at the short-distance communication layer, sends the data to a benefited device; the benefited device receives the data that is sent by the supporting device in a short-distance communication mode, performs integrity verification and decryption by using a short-distance-communication-layer key, and then performs decryption, or decryption and integrity verification processing on the data by using a cooperative-layer key to obtain decrypted data. In this way, a problem that in a cooperative communication process, data transmitted between the benefited device and the base station through the supporting device is obtained by the supporting device or eavesdropped and tampered by another device, is avoided. In the present invention, when a sender (the benefited device or the base station) sends data, a key unknown to the supporting device is used to perform encryption, or encryption and integrity protection on the data at the cooperative layer, so that the supporting device cannot obtain the data; in addition, encryption and integrity protection are performed on the data at the short-distance communication layer, so that the data is not eavesdropped and tampered by another user equipment when the data is transmitted in the short-distance communication mode between the supporting device and the benefited device, thereby implementing secure data transmission between the benefited device, the supporting device, and the base station in the cooperative communication process, and improving network security and reliability of data transmission FIG. 11 is a flowchart of another data transmission method according to an embodiment of the present invention. This embodiment is executed by a supporting device, and a process in which the supporting device processes and forwards received data is described in detail. As shown in FIG. 11, this embodiment includes the following steps:

Step 1101: A supporting device receives first data, which is sent by a benefited device in a short-distance communication mode.

The short-distance communication mode may be a cellular communication mode, or a wireless fidelity Wi-fi mode, or a Bluetooth mode, or an device-to-device D2D mode, or a near field communication NFC mode.

To prevent an attacker from performing, through a radio air interface between the supporting device and the benefited device, security attacks such as eavesdropping, modification, and replay on data to be transmitted, and ensure confidentiality and integrity of the data transmitted between the supporting device and the benefited device, the benefited device may perform encryption and integrity protection processing on the data at a short-distance communication layer.

To implement the technical solution of the present invention, before the supporting device and the benefited device perform data transmission, a short-distance-communication-layer key needs to be obtained, so that integrity verification and decryption are performed on the data after the data sent by the benefited device is received.

The obtaining the short-distance-communication-layer key specifically includes: receiving the short-distance-communication-layer key sent by the network side; or receiving the short-distance-communication-layer key generated according to a key generator by the benefited device and forwarded by the network side; or receiving a second group of parameters sent by the network side, where the second group of parameters is parameters generated by the network side and used by the supporting device to perform key agreement with the benefited device, and after the benefited device receives a first group of parameters, performing, by the supporting device, key agreement with the benefited device, and generating the short-distance-communication-layer key, where the first group of parameters is parameters generated by the network side and used by the benefited device to perform key agreement with the supporting device; or receiving a third group of parameters sent by the benefited device, generating a fourth group of parameters and a shared key, sending the fourth group of parameters to the benefited device, and obtaining, through calculation, by the supporting device, the short-distance-communication-layer key according to the shared key, identity information of the benefited device, and identity information of the supporting device.

Specifically, for the short-distance-communication-layer key, a D-H key agreement technology may be used to generate the short-distance-communication-layer key, so as to protect security of short-distance communication. The short-distance-communication-layer key may be generated by an MME and delivered to the supporting device and the benefited device; may also be generated by the benefited device according to a key generator and sent to the supporting device through the network side; may also be generated through agreement by the supporting device and the benefited device, without involvement of the network side (including a base station, the MME, and so on); and may also be jointly generated by the supporting device, the benefited device, and the network side. After the short-distance-communication-layer key is generated, negotiation about a short-distance-communication-layer encryption algorithm used for short-distance-communication-layer encryption and a short-distance-communication-layer integrity protection algorithm may also be performed between the benefited device and the supporting device to obtain the short-distance-communication-layer encryption algorithm and the short-distance-communication-layer integrity protection algorithm that are to be used.

Specifically, a method in which the MME generates a short-distance-communication-layer key and delivers the short-distance-communication-layer key to the supporting device and the benefited device is as follows: The MME randomly generates a random number Random, and generates a short-distance-communication-layer key HMAC-SHA-256 (Random, B-UE ID, S-UE ID) by using the Random value, identity information of the supporting device, and identity information of the benefited device as inputs of KDF( ) parameters; then, the MME first protects the short-distance-communication-layer key by using a NAS-layer encryption key and a NAS-layer integrity protection key of the benefited device and the supporting device, respectively, and then delivers the short-distance-communication-layer key to the base station; and after encrypting the short-distance-communication-layer key by using a PDCP-layer key (an RRC encryption key and an RRC integrity protection key) of the supporting device, the base station sends the short-distance-communication-layer key to the supporting device by using RRC signaling, and after encrypting the short-distance-communication-layer key by using a PDCP-layer key (an RRC encryption key and an RRC integrity protection key) of the benefited device, the base station sends the short-distance-communication-layer key to the benefited device by using RRC signaling. In this way, the supporting device and the benefited device may respectively obtain the short-distance-communication-layer key. Protection is performed by using a NAS-layer key and a PDCP-layer key of the supporting device when the network side delivers the short-distance-communication-layer key to the supporting device, and protection is performed by using a NAS-layer key and a PDCP-layer key of the benefited device when the network side delivers the short-distance-communication-layer key to the benefited device, thereby ensuring that the short-distance-communication-layer key is not eavesdropped and tampered by another user, and ensuring integrity and confidentiality of the short-distance-communication-layer key.

Specifically, the short-distance-communication-layer key is generated by the benefited device according to the key generator and sent to the supporting device through the network side: The benefited device generates the short-distance-communication-layer key according to the key generator, and saves the short-distance-communication-layer key, and then transmits the key to the mobility management entity by using a NAS message, and the mobility management entity encapsulates the key in a NAS message and sends the key to the supporting device through the base station.

Specifically, a method in which the short-distance-communication-layer key is generated through agreement by the supporting device and the benefited device, without involvement of the network side, may be a D-H mode, or a key matching mode, or a shared key mode, or a null encryption mode, or another similar key agreement mode. The D-H mode is used as an example for description herein. A method for generating a short-distance-communication-layer key in the D-H mode is specifically as follows: The benefited device generates a third group of parameters, namely, a D-H private key a, and public numbers p and g, and $A=(g\hat{\ }a)$ mod p; the benefited device sends the third group of parameters and identity information of the benefited device to the supporting device; the supporting device generates a fourth group of parameters, namely, a private key b and $B=(g\hat{\ }b)$ mod p, and calculates a shared key: share key=$(A\hat{\ }b)$ mod p; the supporting device sends the fourth group of parameters and identity information of the supporting device to the benefited device, and the benefited device calculates a shared key: share key=$(B\hat{\ }a)$ mod p; and the benefited device and the supporting device calculate a short-distance-communication-layer key, including an encryption key and an integrity protection key, according to security parameters such as the shared key share key, the identity information of the benefited device, and the identity information of the supporting device.

Specifically, a method for generating a short-distance-communication-layer key jointly by the supporting device, the benefited device, and the network side is as follows: The MME generates D-H security parameters, including private keys DH_a (a private key of the benefited device) and DH_b (a private key of the supporting device), and public numbers g and q, and sends the D-H security parameters to the base station; the base station sends a second group of parameters, namely, a private key of the supporting device S-UE_DH_b and public numbers g and p, to the supporting device (which is protected by an EPS security mechanism of the supporting device); the base station sends a first group of parameters, namely, a private key of the benefited device B-UE_DH_a and public numbers g and p, to the benefited device (which is protected by an EPS security mechanism of the benefited device); after the supporting device receives the second group of parameters, and the benefited device receives the first group of parameters, the supporting device and the benefited device agree upon a shared key Key_DH by using the D-H security parameters distributed by the base station, and generate, according to the shared key Key_DH, a short-distance-communication-layer key, including an encryption key and an integrity protection key.

Step 1102: Verify integrity of the first data by using a short-distance-communication-layer key, and decrypt the first data to obtain second data, where the second data is data obtained through encryption, or encryption and integrity protection by the benefited device by using a cooperative-layer key of the benefited device.

After receiving the data sent by the benefited device, the supporting device decapsulates the data, performs integrity verification on the decapsulated data at the short-distance communication layer, performs decryption on the decapsulated data, and then transmits the decrypted data to a cooperative layer.

Step 1103: After processing the second data at the cooperative layer, perform encryption, or encryption and integrity protection processing on the second data at a Packet Data Convergence Protocol PDCP layer to obtain third data.

After receiving the data, the cooperative layer of the supporting device may perform bearer mapping on the data; if cooperative-layer header information of the data includes a data sequence number, the cooperative layer of the supporting device may also perform bearer mapping of the data according to the data sequence number, that is, a short-distance bearer between the benefited device and the supporting device is mapped to a radio bearer between the supporting device and the base station, and when forwarding the data to the base station, the cooperative layer of the supporting device may perform cooperative-layer encapsulation on the data, and then deliver the data to a PDCP layer. The supporting device performs, by using a PDCP-layer key of the supporting device at the PDCP layer, encryption, or encryption and integrity protection on the data transmitted from the cooperative layer.

Step 1104: Send the third data to the base station, so that the base station verifies integrity of the third data by using the PDCP-layer key of the supporting device and decrypts the third data to obtain the second data, and decrypts the second data by using the cooperative-layer key of the benefited device.

For user plane data, no integrity protection is performed at the PDCP layer, but only encryption processing is performed. For control plane data, both encryption processing and integrity protection are performed at the PDCP layer.

The supporting device may send the data to the base station through a link between the base station and the supporting device. The base station may perform layer-by-layer decapsulation upwards on the received data, perform decryption, or integrity verification and decryption on the data by using the PDCP-layer key of the supporting device at the PDCP layer, and then perform decryption, or integrity verification and decryption on the data by using the cooperative-layer key of the benefited device at the cooperative layer.

The foregoing describes a method in which a supporting device processes data sent by a benefited device and forwards the data to a base station. A method in which a supporting device processes data sent by a base station and forwards the data to a benefited device is similar to the foregoing method, but the process is reversed. That is, the supporting device receives data sent by the base station, performs short-distance communication encryption and integrity protection processing on the data, and then sends the processed data to the benefited device in a short-distance communication mode.

Specifically, the base station performs cooperative-layer protection at the cooperative layer on data to be sent, performs protection by using the PDCP-layer key of the supporting device at the PDCP layer, and then sends the data to the supporting device; after receiving the data, the supporting device performs decryption, or integrity verification and decryption by using the PDCP-layer key at the PDCP layer, and after processing is performed at the cooperative layer, transmits the data to the short-distance communication layer, and after protection is performed at the short-distance communication layer, sends the data to the benefited device; and the benefited device receives the data that is sent by the supporting device in the short-distance communication mode, performs integrity verification and decryption by using the short-distance-communication-layer key, and then performs decryption, or decryption and integrity verification processing on the data by using the cooperative-layer key to obtain decrypted data.

In this way, in the embodiment of the present invention, a problem that in a cooperative communication process, data transmitted between the benefited device and the base station through the supporting device is obtained by the supporting device or eavesdropped and tampered by another device, is avoided. In the present invention, when a sender (the benefited device or the base station) sends data, a key unknown to the supporting device is used to perform encryption and integrity protection on the data at a cooperative layer, so that the supporting device cannot obtain the data; in addition, encryption and integrity protection are performed on the data at a short-distance communication layer, so that the data is not eavesdropped and tampered by another user equipment when the data is transmitted in the short-distance communication mode between the supporting device and the benefited device, thereby implementing secure data transmission between the benefited device, the supporting device, and the base station in the cooperative communication process, and improving network security and reliability of data transmission.

Figure 12:
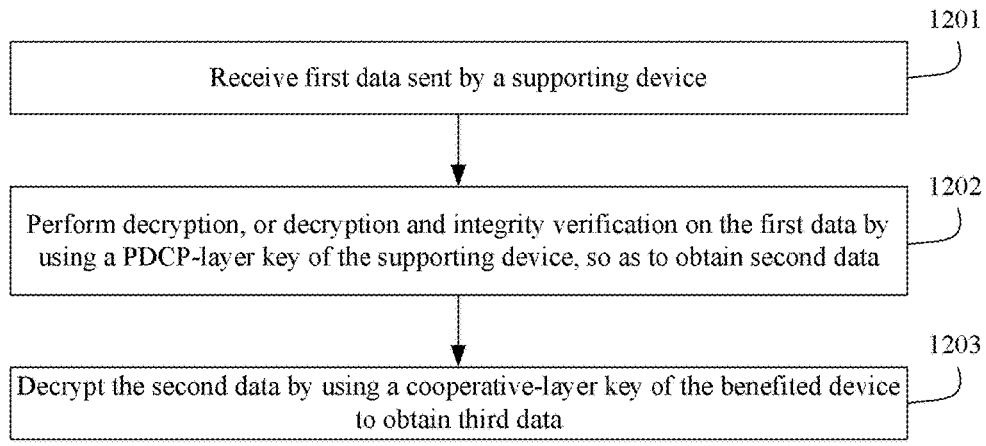
FIG. 12 is a flowchart of another data transmission method according to an embodiment of the present invention.

FIG. 12 is a flowchart of another data transmission method according to an embodiment of the present invention. This embodiment is executed by a base station, and a process in which the base station receives data that is transmitted by a benefited device through a supporting device is described in detail. As shown in FIG. 12, this embodiment includes the following steps:

Step 1201: Receive first data sent by a supporting device.

To prevent the supporting device from obtaining data of a benefited device, and ensure confidentiality and integrity of the data transmitted between the supporting device and the benefited device, a base station may perform encryption and integrity protection processing on the data at a cooperative layer. In this way, before the data is transmitted between the benefited device and the base station, obtaining a cooperative-layer key is further included.

The obtaining the cooperative-layer key specifically includes: receiving the cooperative-layer key sent by a mobility management entity; or performing authentication and key agreement with the benefited device to obtain a parent key, and obtaining, through calculation, the cooperative-layer key according to the parent key; or performing authentication and key agreement with the benefited device to obtain a parent key, generating a base-station key according to the parent key, generating an access-stratum key according to the base-station key, and obtaining, through calculation, the cooperative-layer key according to the base-station key or the access-stratum key.

Specifically, after the benefited device and a mobility management entity (Mobility Management Entity, MME) complete an evolved packet system authentication and key agreement process (Evolved Packet System Authentication and Key Agreement, EPS AKA), a parent key Kasme is obtained. Then, the cooperative-layer key may be generated by using two methods: one method is that the MME generates the cooperative-layer key according to a key derivation function KDF( ) and Kasme, and the other method is that the base station generates the cooperative-layer key according to a base station side key or an access-stratum key. The cooperative-layer key includes encryption keys Int-layer_UPenc and Int-layer_CPenc, and integrity keys Int-layer_Upint and Int-layer_CPint. The encryption key Int-layer_UPenc is used to encrypt user plane data at the cooperative layer, the encryption key Int-layer_CPenc is used to encrypt control plane data at the cooperative layer, the integrity key Int-layer_Upint is used to protect integrity of the user plane data at the cooperative layer, and the integrity key Int-layer_CPint is used to protect integrity of the control plane data at the cooperative layer.

It should be noted that the cooperative-layer key may also be obtained by derivation according to a D-H private key delivered by a network side. Specifically, which method is used to generate the cooperative-layer key may be decided through agreement by the benefited device and the network side.

After the cooperative-layer key is generated, negotiation about a cooperative-layer encryption algorithm used for cooperative-layer encryption and a cooperative-layer integrity protection algorithm may also be performed between the benefited device and the base station to obtain the cooperative-layer encryption algorithm and the integrity protection algorithm that are to be used.

Step 1202: Decrypt the first data by using a PDCP-layer key of the supporting device, or verify integrity of the first data and decrypt the first data to obtain second data.

The supporting device performs, at a PDCP layer by using the PDCP-layer key of the supporting device, encryption, or encryption and integrity protection on the data transmitted from the cooperative layer, and therefore after receiving the first data sent by the supporting device, the base station may decrypt the first data by using the PDCP-layer key of the supporting device at the PDCP layer, or verify integrity of the first data and decrypt the first data.

Step 1203: Decrypt the second data by using a cooperative-layer key of the benefited device to obtain third data.

For user plane data, the benefited device may not perform integrity protection at the cooperative layer, but performs encryption processing only, and therefore after receiving the data sent by the benefited device, the base station may perform decryption processing on the data, without performing integrity verification. If the benefited device performs not only encryption processing but also integrity protection on the data at the cooperative layer, the base station, after receiving the data sent by the benefited device, needs to perform integrity verification, and after integrity verification is complete, performs decryption, so as to obtain the third data.

The foregoing describes a process in which after receiving data of a benefited device forwarded through a supporting device, a base station performs processing. When the base station needs to send data to the benefited device, the base station may perform, by using the cooperative-layer encryption key at the cooperative layer and by using the PDCP-layer key of the supporting device at the PDCP layer, encryption processing on the data to be sent to the benefited device, and then send the processed data to the supporting device; after receiving the data, the supporting device performs decryption, or integrity verification and decryption by using the PDCP-layer key at the PDCP layer, and after processing is performed at the cooperative layer, transmits the data to the short-distance communication layer, and after protection is performed at the short-distance communication layer, sends the data to the benefited device; and the benefited device receives the data that is sent by the supporting device in the short-distance communication mode, performs integrity verification and decryption by using the short-distance-communication-layer key, and then performs decryption, or decryption and integrity verification processing on the data by using the cooperative-layer key to obtain decrypted data.

In this way, in the embodiment of the present invention, a problem that in a cooperative communication process, data transmitted between the benefited device and the base station through the supporting device is obtained by the supporting device or eavesdropped and tampered by another device, is avoided. In the present invention, when a sender (the benefited device or the base station) sends data, a key unknown to the supporting device is used to perform encryption and integrity protection on the data at a cooperative layer, so that the supporting device cannot obtain the data; in addition, encryption and integrity protection are performed on the data at a short-distance communication layer, so that the data is not eavesdropped and tampered by another user equipment when the data is transmitted in the short-distance communication mode between the supporting device and the benefited device, thereby implementing secure data transmission between the benefited device, the supporting device, and the base station in the cooperative communication process, and improving network security and reliability of data transmission.

Figure 13:
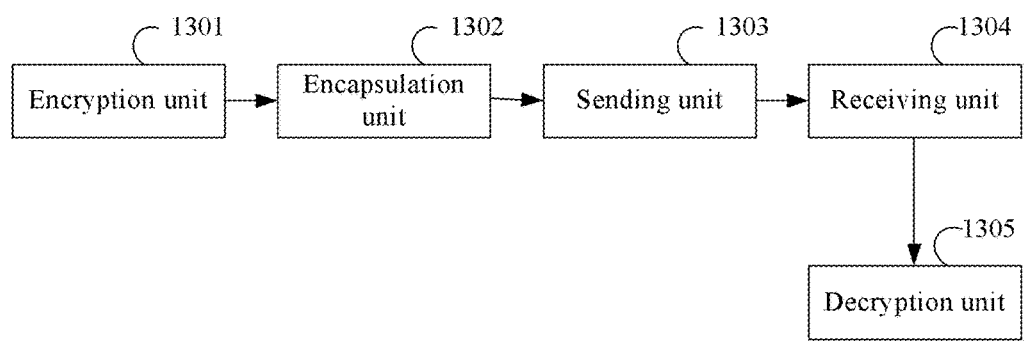
FIG. 13 is a schematic diagram of a data transmission apparatus according to an embodiment of the present invention.

Correspondingly, an embodiment of the present invention further provides a data transmission apparatus. FIG. 13 is a schematic diagram of a data transmission apparatus according to an embodiment of the present invention. As shown in FIG. 13, the apparatus includes the following units: an encryption unit 1301, an encapsulation unit 1302, and a sending unit 1303.

The encryption unit 1301 is configured to obtain a cooperative-layer key, perform encryption, or encryption and integrity protection processing on uplink data by using the cooperative-layer key at a cooperative layer to obtain first encrypted data, and transmit the first encrypted data to the encapsulation unit.

The encryption unit 1301 is specifically configured to: perform authentication and key agreement with a network side to obtain a parent key, and obtain, through calculation, the cooperative-layer key according to the parent key; or perform authentication and key agreement with a network side to obtain a parent key, generate a base-station key according to the parent key, generate an access-stratum key according to the base-station key, and obtain, through calculation, the cooperative-layer key according to the base-station key or the access-stratum key.

The encryption unit 1301 is further configured to perform encryption algorithm negotiation with a base station to obtain a cooperative-layer encryption algorithm.

Specifically, a cooperative-layer key may be generated on an MME, and may also be generated on the base station. After the cooperative-layer key is generated, negotiation about a cooperative-layer encryption algorithm used for cooperative-layer encryption and a cooperative-layer integrity protection algorithm may also be performed between a benefited device and the base station to obtain the cooperative-layer encryption algorithm and the integrity protection algorithm that are to be used.

The method for generating a cooperative-layer key on the MME is as follows: After EPS AKA is completed by the supporting device and the MME, a parent key Kasme is obtained. A key may be generated by using the parent key as an input of a KDF, where the key is a cooperative-layer key.

Specifically, KDF( ) is a key derivation function, KDF( ) in the 3GPP is a function HMAC-sha-256( ), and a cooperative-layer key is HMAC-SHA-256 (Key, S), where, Key is Kasme, and S=FC||P0||L0||P1||L1||P2||L2||P3||L3|| . . . ||Pn||Ln, P0, L0 . . . , which are optional, where, FC is 0x15, P0 is an algorithm type distinguisher (an encryption algorithm indicator or an integrity protection algorithm indicator), L0 is the length of the algorithm type distinguisher (the length of the encryption algorithm indicator or the integrity protection algorithm indicator), P1 is an algorithm identity (identity information of an encryption algorithm or an integrity protection algorithm), and L1 is the length of the algorithm identity (the length of the identity information of the encryption algorithm or the integrity protection algorithm). Optionally, a cooperative-layer key may also be generated by entering another parameter in KDF( ), as long as the benefited device properly negotiates with the MME.

Specifically, the method for generating a cooperative-layer key on the base station is: The base station may generate a cooperative-layer key by using a base station side key KeNB or an access-stratum key as an input of a key derivation function KDF( ). After EPS AKA is completed by the supporting device and the MME to obtain a parent key Kasme, the MME generates KeNB according to Kasme, and sends KeNB to the base station. The MME may generate the key KeNB, namely, a base station side key by using the parent key and a non access stratum communication security protection count NAS UPLINK COUNT as an input of KDF( ). An access-stratum key may be generated according to the base station side key.

It should be noted that the cooperative-layer key may also be obtained by derivation according to a D-H private key delivered by a network side. Specifically, which method is used to generate the cooperative-layer key may be decided through agreement by the benefited device and the network side.

When data to be transmitted is user plane data, the encryption unit 1301 is specifically configured to: perform, according to the cooperative-layer encryption algorithm, encryption on the uplink data by using the cooperative-layer encryption key at the cooperative layer, or perform, according to the cooperative-layer encryption algorithm, encryption on the uplink data by using the cooperative-layer encryption key at the cooperative layer, and perform, according to the cooperative-layer integrity protection algorithm, integrity protection processing on the uplink data by using the cooperative-layer integrity key.

When data to be transmitted is control plane data, the encryption unit 1301 is specifically configured to: perform, according to the cooperative-layer encryption algorithm, encryption on the uplink data by using the cooperative-layer encryption key at the cooperative layer, and perform, according to the cooperative-layer integrity protection algorithm, integrity protection processing on the uplink data by using the cooperative-layer integrity key.

The encapsulation unit 1302 is configured to receive the first encrypted data sent by the encryption unit, perform encapsulation processing on the first encrypted data to obtain first encapsulated data, and transmit the first encapsulated data to the sending unit.

The encapsulation unit 1302 is specifically configured to: perform cooperative-layer encapsulation on the first encrypted data at the cooperative layer to obtain second encapsulated data; and perform short-distance communication encapsulation on the second encapsulated data at a short-distance communication layer to obtain the first encapsulated data.

After performing encryption, at the cooperative layer, on the data to be transmitted, the benefited device performs cooperative-layer encapsulation on the data, and then performs corresponding encapsulation processing on the data at the short-distance communication layer to obtain the first encapsulated data.

It should be noted that, at the short-distance communication layer, encryption processing and integrity protection processing may also be performed on the data that is obtained through encapsulation at the cooperative layer, so as to prevent an attacker from performing, through a radio air interface between the supporting device and the benefited device, security attacks such as eavesdropping, modification, and replay on the data to be transmitted, and ensure confidentiality and integrity of the data transmitted between the supporting device and the benefited device.

The encryption unit 1301 is further configured to: obtain a short-distance-communication-layer key, a short-distance-communication-layer encryption algorithm, and a short-distance-communication-layer integrity protection algorithm; and perform, according to the short-distance-communication-layer encryption algorithm and the short-distance-communication-layer integrity protection algorithm, encryption and integrity protection processing on the second encapsulated data by using the short-distance-communication-layer key.

The encryption unit 1301 is specifically configured to: receive the short-distance-communication-layer key sent by the network side, where the short-range communication-layer key is generated by the network side according to the parent key; or generate the short-distance-communication-layer key, and forward the short-distance-communication-layer key to the supporting device through the network side.

A D-H key agreement technology may be used to generate the short-distance-communication-layer key, so as to protect security of short-distance communication. The short-distance-communication-layer key may be generated by the MME and delivered to the supporting device and the benefited device; may also be generated by the benefited device according to a key generator and sent to the supporting device through the network side; may also be generated through agreement by the supporting device and the benefited device, without involvement of the network side (including the base station, the MME, and so on); may also be jointly generated by the supporting device, the benefited device, and the network side; and may also be generated by the benefited device and forwarded to the supporting device through the MME and the base station. After the short-distance-communication-layer key is generated, negotiation about a short-distance-communication-layer encryption algorithm used for short-distance-communication-layer encryption and a short-distance-communication-layer integrity protection algorithm may also be performed between the benefited device and the supporting device to obtain the short-distance-communication-layer encryption algorithm and the short-distance-communication-layer integrity protection algorithm that are to be used.

Specifically, a method in which the MME generates the short-distance-communication-layer key and delivers the short-distance-communication-layer key to the supporting device and the benefited device is as follows: The MME randomly generates a random number Random, and generates a short-distance-communication-layer key HMAC-SHA-256 (Random, B-UE ID, S-UE ID) by using the Random value, identity information of the supporting device, and identity information of the benefited device as inputs of KDF( ) parameters; then, the MME may send the generated short-distance-communication-layer key to the benefited device and the supporting device by using a NAS message. The MME first protects the short-distance-communication-layer key by using a NAS-layer encryption key and a NAS-layer integrity protection key of the benefited device and the supporting device, respectively, and then delivers the short-distance-communication-layer key to the base station; and after encrypting the short-distance-communication-layer key by using a PDCP-layer key (an RRC encryption key and an RRC integrity protection key) of the supporting device, the base station sends the short-distance-communication-layer key to the supporting device by using RRC signaling, and after encrypting the short-distance-communication-layer key by using a PDCP-layer key (an RRC encryption key and an RRC integrity protection key) of the benefited device, the base station sends the short-distance-communication-layer key to the benefited device by using RRC signaling. In this way, the supporting device and the benefited device may respectively obtain the short-distance-communication-layer key. Protection is performed by using a NAS-layer key and a PDCP-layer key of the supporting device when the network side delivers the short-distance-communication-layer key to the supporting device, and protection is performed by using a PDCP-layer key of the benefited device when the network side delivers the short-distance-communication-layer key to the benefited device, thereby ensuring that the short-distance-communication-layer key is not eavesdropped and tampered by another user, and ensuring integrity and confidentiality of the short-distance-communication-layer key.

Specifically, the short-distance-communication-layer key is generated by the benefited device according to the key generator and sent to the supporting device through the network side: The benefited device generates the short-distance-communication-layer key according to the key generator, and saves the short-distance-communication-layer key, and then transmits the key to the mobility management entity by using a NAS message, and the mobility management entity encapsulates the key in a NAS message and sends the key to the supporting device through the base station.

Specifically, a method in which the short-distance-communication-layer key is generated through agreement by the supporting device and the benefited device, without involvement of the network side, may be a D-H mode, or a key matching mode, or a shared key mode, or a null encryption mode, or another similar key agreement mode. The D-H mode is used as an example for description herein. A method for generating a short-distance-communication-layer key in the D-H mode is specifically as follows: The benefited device generates a third group of parameters, namely, a D-H private key a, and public numbers p and g, and $A=(g\hat{\ }a)$ mod p; the benefited device sends the third group of parameters and identity information of the benefited device to the supporting device; the supporting device generates a fourth group of parameters, namely, a private key b and $B=(g\hat{\ }b)$ mod p, and calculates a shared key: share key=$(A\hat{\ }b)$ mod p; the supporting device sends the fourth group of parameters and identity information of the supporting device to the benefited device, and the benefited device calculates a shared key: share key=$(B\hat{\ }a)$ mod p; and the benefited device and the supporting device calculate a short-distance-communication-layer key, including an encryption key and an integrity protection key, according to security parameters such as the shared key share key, the identity information of the benefited device, and the identity information of the supporting device.

Specifically, a method for generating a short-distance-communication-layer key jointly by the supporting device, the benefited device, and the network side is as follows: The MME generates D-H security parameters, including private keys DH_a (a private key of the benefited device) and DH_b (a private key of the supporting device), and public numbers g and q, and sends the D-H security parameters to the base station; the base station sends a second group of parameters, namely, a private key of the supporting device S-UE_DH_b and public numbers g and p, to the supporting device (which is protected by an EPS security mechanism of the supporting device); the base station sends a first group of parameters, namely, a private key of the benefited device B-UE_DH_a and public numbers g and p, to the benefited device (which is protected by an EPS security mechanism of the benefited device); after the supporting device receives the second group of parameters, and the benefited device receives the first group of parameters, the supporting device and the benefited device agree upon a shared key Key_DH by using the D-H security parameters distributed by the base station, and generate, according to the shared key Key_DH, a short-distance-communication-layer key, including an encryption key and an integrity protection key.

The sending unit 1303 is configured to receive the first encapsulated data sent by the encapsulation unit, and send the first encapsulated data to the supporting device in a short-distance communication mode, so that the supporting device processes the first encapsulated data to obtain second encapsulated data, and sends the second encapsulated data to the base station.

After encapsulation is performed on the data at the short-distance communication layer, the first encapsulated data may be sent to the supporting device in the short-distance communication mode, such as a cellular communication mode, or a wireless fidelity Wi-fi mode, or a Bluetooth mode, or an device-to-device D2D mode, or a near field communication NFC mode.

Preferably, the apparatus provided by the embodiment of the present invention further includes: a receiving unit 1304 and a decryption unit 1305, where the receiving unit 1304 is configured to receive data that is sent by the supporting device in the short-distance communication mode; and the decryption unit 1305 is configured to perform decryption processing on the data by using the cooperative-layer key of the benefited device to obtain decrypted data, or configured to perform decryption and integrity verification processing on the data by using the cooperative-layer key of the benefited device to obtain decrypted data.

The decryption unit 1305 is further configured to perform, by using the short-distance-communication-layer key, decryption and integrity verification on the data sent by the supporting device.

The foregoing describes a method in which a benefited device sends data to a base station through a supporting device, and a method in which a base station sends data to a benefited device through a supporting device is similar to the foregoing method. That is, the method in which a base station sends data to a benefited device through a supporting device is as follows: The base station performs cooperative-layer protection at the cooperative layer on data to be sent, performs protection by using the PDCP-layer key of the supporting device at the PDCP layer, and then sends the data to the supporting device; after receiving the data, the supporting device performs decryption, or integrity verification and decryption by using the PDCP-layer key at the PDCP layer, and after processing is performed at the cooperative layer, transmits the data to the short-distance communication layer, and after protection is performed at the short-distance communication layer, sends the data to the benefited device; and the benefited device receives the data that is sent by the supporting device in the short-distance communication mode, performs integrity verification and decryption by using the short-distance-communication-layer key, and then performs decryption processing, or decryption and integrity verification processing on the data by using the cooperative-layer key to obtain decrypted data.

In this way, in the embodiment of the present invention, a problem that in a cooperative communication process, data transmitted between the benefited device and the base station through the supporting device is obtained by the supporting device or eavesdropped and tampered by another device, is avoided. In the present invention, when a sender (the benefited device or the base station) sends data, a key unknown to the supporting device is used to perform encryption and integrity protection on the data at a cooperative layer, so that the supporting device cannot obtain the data; in addition, encryption and integrity protection are performed on the data at a short-distance communication layer, so that the data is not eavesdropped and tampered by another user equipment when the data is transmitted in the short-distance communication mode between the supporting device and the benefited device, thereby implementing secure data transmission between the benefited device, the supporting device, and the base station in the cooperative communication process, and improving network security and reliability of data transmission.

Figure 14:
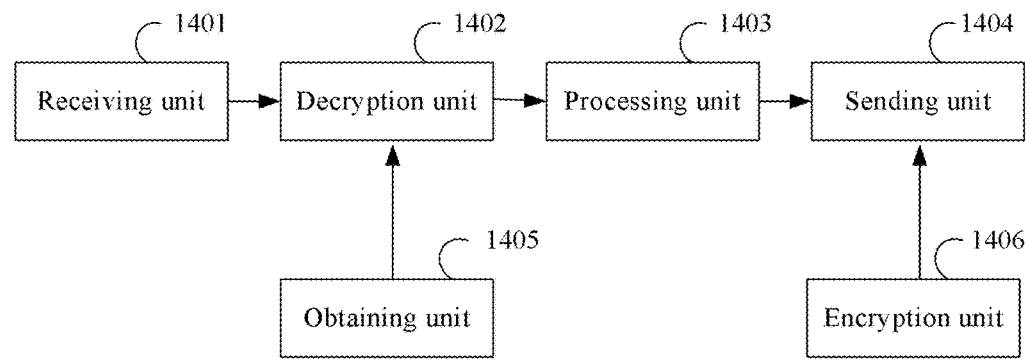
FIG. 14 is a schematic diagram of another data transmission apparatus according to an embodiment of the present invention.

Correspondingly, an embodiment of the present invention further provides a data transmission apparatus. FIG. 14 is a schematic diagram of another data transmission apparatus according to an embodiment of the present invention. As shown in FIG. 14, the embodiment of the present invention includes the following units: a receiving unit 1401, a decryption unit 1402, a processing unit 1403, and a sending unit 1404.

The receiving unit 1401 is configured to receive first data, which is sent by a benefited device in a short-distance communication mode, and transmit the first data to the decryption unit.

The short-distance communication mode may be a cellular communication mode, or a wireless fidelity Wi-fi mode, or a Bluetooth mode, or an device-to-device D2D mode, or a near field communication NFC mode.

The decryption unit 1402 is configured to receive the first data transmitted by the receiving unit, verify integrity of the first data by using a short-distance-communication-layer key, decrypt the first data to obtain second data, where the second data is data obtained through encryption, or encryption and integrity protection by the benefited device by using a cooperative-layer key of the benefited device, and transmit the second data to the processing unit.

To prevent an attacker from performing, through a radio air interface between a supporting device and the benefited device, security attacks such as eavesdropping, modification, and replay on data to be transmitted, and ensure confidentiality and integrity of the data transmitted between the supporting device and the benefited device, the benefited device may perform encryption and integrity protection processing on the data at a short-distance communication layer.

The embodiment of the present invention further includes an obtaining unit 1405, configured to obtain the short-distance-communication-layer key. To implement the technical solution of the present invention, before the supporting device and the benefited device perform data transmission, the short-distance-communication-layer key needs to be obtained, so that integrity verification and decryption are performed on the data after the data sent by the benefited device is received.

The obtaining unit 1405 is specifically configured to: receive the short-distance-communication-layer key sent by the network side; or receive the short-distance-communication-layer key generated according to a key generator by the benefited device and forwarded by the network side; or receive a second group of parameters sent by the network side, where the second group of parameters is parameters generated by the network side and used by the supporting device to perform key agreement with the benefited device, and after the benefited device receives a first group of parameters, perform key agreement with the benefited device, and generate the short-distance-communication-layer key, where the first group of parameters is parameters generated by the network side and used by the benefited device to perform key agreement with the supporting device; or receive a third group of parameters sent by the benefited device, generate a fourth group of parameters and a shared key, send the fourth group of parameters to the benefited device, and obtain, through calculation, the short-distance-communication-layer key according to the shared key, identity information of the benefited device, and identity information of the supporting device.

Specifically, for the short-distance-communication-layer key, a D-H key agreement technology may be used to generate the short-distance-communication-layer key, so as to protect security of short-distance communication. The short-distance-communication-layer key may be generated by an MME and delivered to the supporting device and the benefited device; may also be generated by the benefited device according to a key generator and sent to the supporting device through the network side; may also be generated through agreement by the supporting device and the benefited device, without involvement of the network side (including a base station, the MME, and so on); and may also be jointly generated by the supporting device, the benefited device, and the network side. After the short-distance-communication-layer key is generated, negotiation about a short-distance-communication-layer encryption algorithm used for short-distance-communication-layer encryption and a short-distance-communication-layer integrity protection algorithm may also be performed between the benefited device and the supporting device to obtain the short-distance-communication-layer encryption algorithm and the short-distance-communication-layer integrity protection algorithm that are to be used.

The processing unit 1403 is configured to receive the second data transmitted by the decryption unit, and after processing the second data at a cooperative layer, perform encryption processing, or encryption and integrity protection processing on the second data at a Packet Data Convergence Protocol PDCP layer to obtain third data, and transmit the third data to the sending unit.

After receiving the data sent by the benefited device, the supporting device decapsulates the data, performs integrity verification on the decapsulated data at the short-distance communication layer, performs decryption on the decapsulated data, and then transmits the decrypted data to the cooperative layer.

After receiving the data, the cooperative layer of the supporting device may perform bearer mapping on the data;

if cooperative-layer header information of the data includes a data sequence number, the cooperative layer of the supporting device may also perform bearer mapping of the data according to the data sequence number. When forwarding the data to the base station, the cooperative layer of the supporting device may perform cooperative-layer encapsulation on the data, and then deliver the data to the PDCP layer. The supporting device performs, by using a PDCP-layer key of the supporting device at the PDCP layer, encryption, or encryption and integrity protection on the data transmitted from the cooperative layer.

The sending unit 1404 is configured to receive the third data sent by the processing unit, and send the third data to the base station, so that the base station performs decryption, or decryption and integrity verification on the third data by using the PDCP-layer key of the supporting device to obtain the second data, and decrypts the second data by using the cooperative-layer key of the benefited device.

The supporting device may send the data to the base station through a link between the base station and the supporting device. The base station performs layer-by-layer decapsulation upwards on the received data, performs decryption, or integrity verification and decryption on the data by using the PDCP-layer key of the supporting device at the PDCP layer, and then performs decryption, or integrity verification and decryption on the data by using the cooperative-layer key of the benefited device at the cooperative layer.

Preferably, the embodiment of the present invention further includes an encryption unit 1406, configured to receive data sent by the base station, and perform short-distance communication encryption and integrity protection processing on the data to obtain fourth data. The sending unit 1404 is further configured to send the fourth data to the benefited device in the short-distance communication mode.

The foregoing describes a method in which a supporting device processes data sent by a benefited device and forwards the data to a base station. A method in which a supporting device processes data sent by a base station and forwards the data to a benefited device is similar to the foregoing method, but the process is reversed. That is, the supporting device receives data sent by the base station, performs short-distance communication encryption and integrity protection processing on the data, and then sends the processed data to the benefited device in a short-distance communication mode.

Specifically, the base station performs cooperative-layer protection at the cooperative layer on data to be sent, performs protection by using the PDCP-layer key of the supporting device at the PDCP layer, and then sends the data to the supporting device; after receiving the data, the supporting device performs decryption, or integrity verification and decryption by using the PDCP-layer key at the PDCP layer, and after processing is performed at the cooperative layer, transmits the data to the short-distance communication layer, and after protection is performed at the short-distance communication layer, sends the data to the benefited device; and the benefited device receives the data that is sent by the supporting device in the short-distance communication mode, performs integrity verification and decryption by using the short-distance-communication-layer key, and then performs decryption processing, or decryption processing and integrity verification processing on the data by using the cooperative-layer key to obtain decrypted data.

In this way, in the embodiment of the present invention, a problem that in a cooperative communication process, data transmitted between the benefited device and the base station through the supporting device is obtained by the supporting device or eavesdropped and tampered by another device, is avoided. In the present invention, when a sender (the benefited device or the base station) sends data, a key unknown to the supporting device is used to perform encryption and integrity protection on the data at a cooperative layer, so that the supporting device cannot obtain the data; in addition, encryption and integrity protection are performed on the data at a short-distance communication layer, so that the data is not eavesdropped and tampered by another user equipment when the data is transmitted in the short-distance communication mode between the supporting device and the benefited device, thereby implementing secure data transmission between the benefited device, the supporting device, and the base station in the cooperative communication process, and improving network security and reliability of data transmission.

Figure 15:
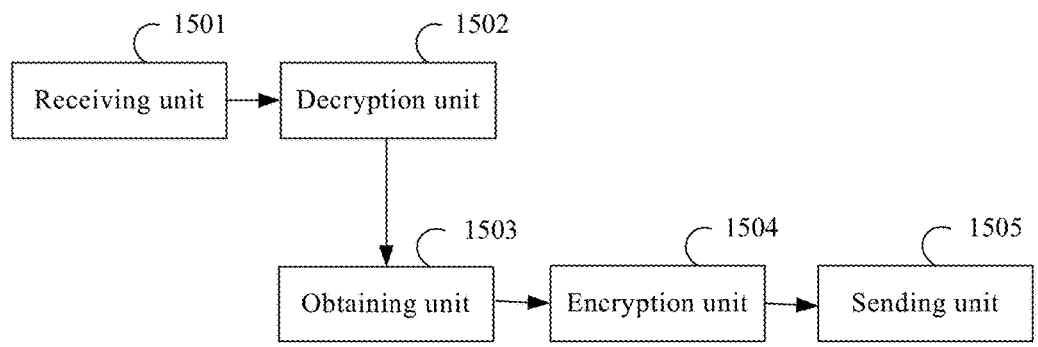
FIG. 15 is a schematic diagram of another data transmission apparatus according to an embodiment of the present invention.

Correspondingly, an embodiment of the present invention further provides a data transmission apparatus. FIG. 15 is a schematic diagram of another data transmission apparatus according to an embodiment of the present invention. As shown in FIG. 15, this embodiment includes the following units:

a receiving unit 1501, configured to receive first data sent by a supporting device and transmit the first data to a decryption unit; and the decryption unit 1502, configured to receive the first data sent by the receiving unit, perform decryption, or decryption and integrity verification on the first data by using a PDCP-layer key of the supporting device, so as to obtain second data, and decrypt the second data by using a cooperative-layer key of a benefited device to obtain third data.

The decryption unit 1502 is further configured to verify integrity of the second data.

For user plane data, the benefited device may not perform integrity protection at a cooperative layer, but performs encryption processing only, and therefore after receiving the data sent by the benefited device, a base station may perform decryption processing on the data, without performing integrity verification. If the benefited device performs not only encryption processing but also integrity protection on the data at the cooperative layer, the base station, after receiving the data sent by the benefited device, needs to perform integrity verification, and after integrity verification is complete, performs decryption, so as to obtain the third data.

Preferably, the apparatus provided by the embodiment of the present invention further includes an obtaining unit 1503, configured to obtain the cooperative-layer key. The obtaining unit 1503 is specifically configured to: receive the cooperative-layer key generated and sent by a mobility management entity or the base station; or perform authentication and key agreement with the benefited device to obtain a parent key, and obtain, through calculation, the cooperative-layer key according to the parent key; or perform authentication and key agreement with the benefited device to obtain a parent key, generate a base-station key according to the parent key, generate an access-stratum key according to the base-station key, and obtain, through calculation, the cooperative-layer key according to the base-station key or the access-stratum key.

Specifically, after EPS AKA is completed by the benefited device and the MME, a parent key Kasme is obtained, and the cooperative-layer key may be generated by using two methods: one method is that the MME generates the cooperative-layer key according to a key derivation function KDF( ) and Kasme, and the other method is that the base station generates the cooperative-layer key according to a base station side key or an access-stratum key. The cooperative-layer key includes encryption keys Int-layer_UPenc and Int-layer_CPenc, and integrity keys Int-layer_Upint and Int-layer_CPint. The encryption key Int-layer_UPenc is used to encrypt user plane data at the cooperative layer, the encryption key Int-layer_CPenc is used to encrypt control plane data at the cooperative layer, the integrity key Int-layer_Upint is used to protect integrity of the user plane data at the cooperative layer, and the integrity key Int-layer_CPint is used to protect integrity of the control plane data at the cooperative layer.

It should be noted that the cooperative-layer key may also be obtained by derivation according to a D-H private key delivered by a network side. Specifically, which method is used to generate the cooperative-layer key may be decided through agreement by the benefited device and the network side.

After the cooperative-layer key is generated, negotiation about a cooperative-layer encryption algorithm used for cooperative-layer encryption and a cooperative-layer integrity protection algorithm may also be performed between the benefited device and the base station to obtain the cooperative-layer encryption algorithm and the integrity protection algorithm that are to be used.

The apparatus further includes an encryption unit 1504 and a sending unit 1505, where the encryption unit 1504 is configured to perform, at the cooperative layer by using a cooperative-layer encryption key, encryption processing on data to be sent to the benefited device to obtain fourth data; and the sending unit 1505 is configured to send the fourth data to the supporting device, so that the supporting device processes the fourth data and sends the processed data to the benefited device.

The foregoing describes a process in which after receiving data of a benefited device forwarded through a supporting device, a base station performs processing. When the base station needs to send data to the benefited device, the base station may perform, by using the cooperative-layer encryption key at the cooperative layer and by using the PDCP-layer key of the supporting device at the PDCP layer, encryption processing on the data to be sent to the benefited device, and then send the processed data to the supporting device; after receiving the data, the supporting device performs decryption, or integrity verification and decryption by using the PDCP-layer key at the PDCP layer, and after processing is performed at the cooperative layer, transmits the data to the short-distance communication layer, and after protection is performed at the short-distance communication layer, sends the data to the benefited device; and the benefited device receives the data that is sent by the supporting device in the short-distance communication mode, performs integrity verification and decryption by using the short-distance-communication-layer key, and then performs decryption processing, or decryption and integrity verification processing on the data by using the cooperative-layer key to obtain decrypted data.

In this way, in the embodiment of the present invention, a problem that in a cooperative communication process, data transmitted between the benefited device and the base station through the supporting device is obtained by the supporting device or eavesdropped and tampered by another device, is avoided. In the present invention, when a sender (the benefited device or the base station) sends data, a key unknown to the supporting device is used to perform encryption and integrity protection on the data at a cooperative layer, so that the supporting device cannot obtain the data; in addition, encryption and integrity protection are performed on the data at a short-distance communication layer, so that the data is not eavesdropped and tampered by another user equipment when the data is transmitted in the short-distance communication mode between the supporting device and the benefited device, thereby implementing secure data transmission between the benefited device, the supporting device, and the base station in the cooperative communication process, and improving network security and reliability of data transmission.

Figure 16:
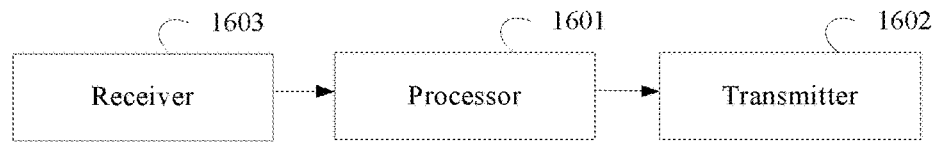
FIG. 16 is a schematic diagram of a benefited device according to an embodiment of the present invention.

Correspondingly, an embodiment of the present invention further provides a benefited device. FIG. 16 is a schematic diagram of a benefited device according to an embodiment of the present invention. As shown in FIG. 16, the benefited device provided by the embodiment of the present invention includes the following components: a processor 1601, a transmitter 1602, and a receiver 1603.

The processor 1601 is configured to obtain a cooperative-layer key, perform encryption, or encryption and integrity protection processing on uplink data by using the cooperative-layer key at a cooperative layer to obtain first encrypted data, perform encapsulation processing on the first encrypted data to obtain first encapsulated data, and transmit the first encapsulated data to the transmitter.

The processor 1601 is specifically configured to: perform authentication and key agreement with a network side to obtain a parent key, and obtain, through calculation, the cooperative-layer key according to the parent key; or perform authentication and key agreement with a network side to obtain a parent key, generate a base-station key according to the parent key, generate an access-stratum key according to the base-station key, and finally obtain, through calculation, the cooperative-layer key according to the base-station key or the access-stratum key.

The processor 1601 is further configured to: perform encryption algorithm negotiation with a base station to obtain a cooperative-layer encryption algorithm.

The processor 1601 is specifically configured to: perform cooperative-layer encapsulation on the first encrypted data at the cooperative layer to obtain second encapsulated data; and perform short-distance communication encapsulation on the second encapsulated data at a short-distance communication layer to obtain the first encapsulated data.

Specifically, the cooperative-layer key may be generated on an MME, and may also be generated on the base station. After the cooperative-layer key is generated, negotiation about a cooperative-layer encryption algorithm used for cooperative-layer encryption and a cooperative-layer integrity protection algorithm may also be performed between the benefited device and the base station to obtain the cooperative-layer encryption algorithm and the integrity protection algorithm that are to be used.

The method for generating a cooperative-layer key on the MME is as follows: After EPS AKA is completed by the supporting device and the MME, a parent key Kasme is obtained. A key may be generated by using the parent key as an input of a KDF, where the key is a cooperative-layer key.

Specifically, KDF( ) is a key derivation function, KDF( ) in the 3GPP is a function HMAC-sha-256( ), and a cooperative-layer key is HMAC-SHA-256 (Key, S), where, Key is Kasme, and S=FC∥P0∥L0∥P1∥L1∥P2∥L2∥P3∥L3∥ . . . ∥Pn∥Ln, P0, L0 . . . , which are optional, where, FC is 0x15, P0 is an algorithm type distinguisher (an encryption algorithm indicator or an integrity protection algorithm indicator), L0 is the length of the algorithm type distinguisher (the length of the encryption algorithm indicator or the integrity protection algorithm indicator), P1 is an algorithm identity (identity information of an encryption algorithm or an integrity protection algorithm), and L1 is the length of the algorithm identity (the length of the identity information of the encryption algorithm or the integrity protection algorithm). Optionally, a cooperative-layer key may also be generated by entering another parameter in KDF( ) as long as the benefited device properly negotiates with the MME.

Specifically, the method for generating a cooperative-layer key on the base station is: The base station may generate the cooperative-layer key by using a base station side key KeNB or an access-stratum key as an input of a key derivation function KDF( ). After EPS AKA is completed by the supporting device and the MME to obtain a parent key Kasme, the MME generates KeNB according to Kasme, and sends KeNB to the base station. The MME may generate the key KeNB, namely, a base station side key by using the parent key and a non access stratum communication security protection count NAS UPLINK COUNT as an input of KDF( ). An access-stratum key may be generated according to the base station side key.

It should be noted that the cooperative-layer key may also be obtained by derivation according to a D-H private key delivered by the network side. Specifically, which method is used to generate the cooperative-layer key may be decided through agreement by the benefited device and the network side.

When data to be transmitted is user plane data, the processor 1601 is specifically configured to: perform, according to the cooperative-layer encryption algorithm, encryption on the uplink data by using the cooperative-layer encryption key at the cooperative layer, or perform, according to the cooperative-layer encryption algorithm, encryption on the uplink data by using the cooperative-layer encryption key at the cooperative layer, and perform, according to the cooperative-layer integrity protection algorithm, integrity protection processing on the uplink data by using the cooperative-layer integrity key.

When data to be transmitted is control plane data, the processor 1601 is specifically configured to: perform, according to the cooperative-layer encryption algorithm, encryption on the uplink data by using the cooperative-layer encryption key at the cooperative layer, and perform, according to the cooperative-layer integrity protection algorithm, integrity protection processing on the uplink data by using the cooperative-layer integrity key.

It should be noted that, at the short-distance communication layer, encryption processing and integrity protection processing may also be performed on the data that is obtained through encapsulation at the cooperative layer, so as to prevent an attacker from performing, through a radio air interface between the supporting device and the benefited device, security attacks such as eavesdropping, modification, and replay on the data to be transmitted, and ensure confidentiality and integrity of the data transmitted between the supporting device and the benefited device.

The processor 1601 is further configured to: obtain a short-distance-communication-layer key, a short-distance-communication-layer encryption algorithm, and a short-distance-communication-layer integrity protection algorithm; and perform, according to the short-distance-communication-layer encryption algorithm and the short-distance-communication-layer integrity protection algorithm, encryption and integrity protection processing on the second encapsulated data by using the short-distance-communication-layer key.

A D-H key agreement technology may be used to generate the short-distance-communication-layer key, so as to protect security of short-distance communication. The short-distance-communication-layer key may be generated by the MME and delivered to the supporting device and the benefited device; may also be generated by the benefited device according to a key generator and sent to the supporting device through the network side; may also be generated through agreement by the supporting device and the benefited device, without involvement of the network side (including the base station, the MME, and so on); and may also be jointly generated by the supporting device, the benefited device, and the network side. After the short-distance-communication-layer key is generated, negotiation about a short-distance-communication-layer encryption algorithm used for short-distance-communication-layer encryption and a short-distance-communication-layer integrity protection algorithm may also be performed between the benefited device and the supporting device to obtain the short-distance-communication-layer encryption algorithm and the short-distance-communication-layer integrity protection algorithm that are to be used.

The transmitter 1602 is configured to receive the first encapsulated data sent by the processor, and send the first encapsulated data to the supporting device in a short-distance communication mode, so that the supporting device processes the first encapsulated data to obtain second encapsulated data and sends the second encapsulated data to the base station.

After encapsulation is performed on the data at the short-distance communication layer, the first encapsulated data may be sent to the supporting device in the short-distance communication mode, such as a cellular communication mode, or a wireless fidelity Wi-fi mode, or a Bluetooth mode, or an device-to-device D2D mode, or a near field communication NFC mode.

Preferably, the benefited device further includes a receiver 1603, where the receiver 1603 is configured to receive data that is sent by the supporting device in the short-distance communication mode. The processor 1601 is configured to perform decryption processing, or decryption processing and integrity verification processing on the data by using the cooperative-layer key of the benefited device to obtain decrypted data.

The processor 1601 is further configured to perform, by using the short-distance-communication-layer key, decryption and integrity verification on the data sent by the supporting device.

The foregoing describes a method in which a benefited device sends data to a base station through a supporting device, and a method in which a base station sends data to a benefited device through a supporting device is similar to the foregoing method. That is, the method in which a base station sends data to a benefited device through a supporting device is as follows: The base station performs cooperative-layer protection at the cooperative layer on data to be sent, performs protection by using the PDCP-layer key of the supporting device at the PDCP layer, and then sends the data to the supporting device; after receiving the data, the supporting device performs decryption, or integrity verification and decryption by using the PDCP-layer key at the PDCP layer, and after processing is performed at the cooperative layer, transmits the data to the short-distance communication layer, and after protection is performed at the short-distance communication layer, sends the data to the benefited device; and the benefited device receives the data that is sent by the supporting device in the short-distance communication mode, performs integrity verification and decryption by using the short-distance-communication-layer key, and then performs decryption, or decryption and integrity verification processing on the data by using the cooperative-layer key to obtain decrypted data.

In this way, in the embodiment of the present invention, a problem that in a cooperative communication process, data transmitted between the benefited device and the base station through the supporting device is obtained by the supporting device or eavesdropped and tampered by another device, is avoided. In the present invention, when a sender (the benefited device or the base station) sends data, a key unknown to the supporting device is used to perform encryption and integrity protection on the data at a cooperative layer, so that the supporting device cannot obtain the data; in addition, encryption and integrity protection are performed on the data at a short-distance communication layer, so that the data is not eavesdropped and tampered by another user equipment when the data is transmitted in the short-distance communication mode between the supporting device and the benefited device, thereby implementing secure data transmission between the benefited device, the supporting device, and the base station in the cooperative communication process, and improving network security and reliability of data transmission.

Figure 17:
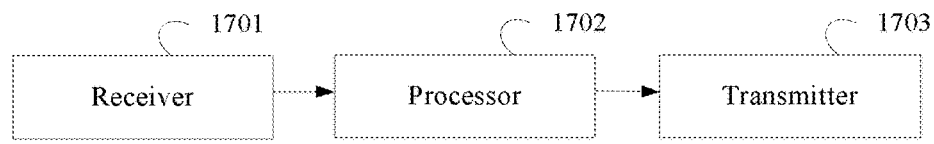
FIG. 17 is a schematic diagram of a supporting device according to an embodiment of the present invention.

Correspondingly, an embodiment of the present invention further provides a supporting device. FIG. 17 is a schematic diagram of a supporting device according to an embodiment of the present invention. As shown in FIG. 17, this embodiment includes the following components: a receiver 1701, a processor 1702, and a transmitter 1703.

The receiver 1701 is configured to receive first data, which is sent by a benefited device in a short-distance communication mode, and transmit the first data to the processor.

The short-distance communication mode may be a cellular communication mode, or a wireless fidelity Wi-fi mode, or a Bluetooth mode, or an device-to-device D2D mode, or a near field communication NFC mode.

The processor 1702 is configured to receive the first data transmitted by the receiver, verify integrity of the first data by using a short-distance-communication-layer key, and decrypt the first data to obtain second data, where the second data is data obtained through encryption, or encryption and integrity protection by the benefited device by using a cooperative-layer key of the benefited device; and after processing the second data at a cooperative layer, perform encryption processing, or encryption and integrity protection processing on the second data at a Packet Data Convergence Protocol PDCP layer to obtain third data, and transmit the third data to the transmitter.

The processor 1702 is further configured to obtain the short-distance communication key. The processor 1702 is specifically configured to: receive the short-distance-communication-layer key sent by the network side; or receive the short-distance-communication-layer key generated according to a key generator by the benefited device and forwarded by the network side; or receive a second group of parameters sent by the network side, where the second group of parameters is parameters generated by the network side and used by the supporting device to perform key agreement with the benefited device, and after the benefited device receives a first group of parameters, perform key agreement between the supporting device and the benefited device, and generate the short-distance-communication-layer key, where the first group of parameters is parameters generated by the network side and used by the benefited device to perform key agreement with the supporting device; or receive a third group of parameters sent by the benefited device, generate a fourth group of parameters and a shared key, send the fourth group of parameters to the benefited device, and obtain, through calculation, the short-distance-communication-layer key by the supporting device according to the shared key, identity information of the benefited device, and identity information of the supporting device.

To implement the technical solution of the present invention, before the supporting device and the benefited device perform data transmission, the short-distance-communication-layer key needs to be obtained, so that integrity verification and decryption are performed on the data after the data sent by the benefited device is received. Specifically, for the short-distance-communication-layer key, a D-H key agreement technology may be used to generate the short-distance-communication-layer key, so as to protect security of short-distance communication. The short-distance-communication-layer key may be generated by an MME and delivered to the supporting device and the benefited device; may also be generated by the benefited device according to a key generator and sent to the supporting device through the network side; may also be generated through agreement by the supporting device and the benefited device, without involvement of the network side (including the base station, the MME, and so on); and may also be jointly generated by the supporting device, the benefited device, and the network side. After the short-distance-communication-layer key is generated, negotiation about a short-distance-communication-layer encryption algorithm used for short-distance-communication-layer encryption and a short-distance-communication-layer integrity protection algorithm may also be performed between the benefited device and the supporting device to obtain the short-distance-communication-layer encryption algorithm and the short-distance-communication-layer integrity protection algorithm that are to be used.

After receiving the data sent by the benefited device, the supporting device decapsulates the data, performs integrity verification on the decapsulated data at the short-distance communication layer, performs decryption on the decapsulated data, and then transmits the decrypted data to the cooperative layer.

After receiving the data, the cooperative layer of the supporting device may perform bearer mapping on the data; if cooperative-layer header information of the data includes a data sequence number, the cooperative layer of the supporting device may also perform bearer mapping of the data according to the data sequence number. When forwarding the data to the base station, the cooperative layer of the supporting device may perform cooperative-layer encapsulation on the data, and then deliver the data to the PDCP layer. The supporting device performs, by using a PDCP-layer key of the supporting device at the PDCP layer, encryption, or encryption and integrity protection on the data transmitted from the cooperative layer.

The transmitter 1703 is configured to receive the third data sent by the processor, and send the third data to the base station, so that the base station performs decryption, or decryption and integrity verification on the third data by using the PDCP-layer key of the supporting device to obtain the second data, and decrypts the second data by using the cooperative-layer key of the benefited device.

The processor 1702 is further configured to receive data sent by the base station, perform short-distance communication encryption and integrity protection processing on the data to obtain fourth data, and the transmitter 1703 is further configured to send the fourth data to the benefited device in the short-distance communication mode.

The foregoing describes a method in which a supporting device processes data sent by a benefited device and forwards the data to a base station. A method in which a supporting device processes data sent by a base station and forwards the data to a benefited device is similar to the foregoing method, but the process is reversed. That is, the supporting device receives data sent by the base station, performs short-distance communication encryption and integrity protection processing on the data, and then sends the processed data to the benefited device in a short-distance communication mode.

Specifically, the base station performs cooperative-layer protection at the cooperative layer on data to be sent, performs protection by using the PDCP-layer key of the supporting device at the PDCP layer, and then sends the data to the supporting device; after receiving the data, the supporting device performs decryption, or integrity verification and decryption by using the PDCP-layer key at the PDCP layer, and after processing is performed at the cooperative layer, transmits the data to the short-distance communication layer, and after protection is performed at the short-distance communication layer, sends the data to the benefited device; and the benefited device receives the data that is sent by the supporting device in the short-distance communication mode, performs integrity verification and decryption by using the short-distance-communication-layer key, and then performs decryption, or decryption and integrity verification processing on the data by using the cooperative-layer key to obtain decrypted data.

In this way, in the embodiment of the present invention, a problem that in a cooperative communication process, data transmitted between the benefited device and the base station through the supporting device is obtained by the supporting device or eavesdropped and tampered by another device, is avoided. In the present invention, when a sender (the benefited device or the base station) sends data, a key unknown to the supporting device is used to perform encryption and integrity protection on the data at a cooperative layer, so that the supporting device cannot obtain the data; in addition, encryption and integrity protection are performed on the data at a short-distance communication layer, so that the data is not eavesdropped and tampered by another user equipment when the data is transmitted in the short-distance communication mode between the supporting device and the benefited device, thereby implementing secure data transmission between the benefited device, the supporting device, and the base station in the cooperative communication process, and improving network security and reliability of data transmission.

Figure 18:
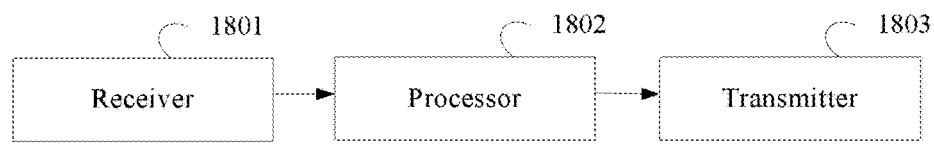
FIG. 18 is a schematic diagram of a base station according to an embodiment of the present invention.

Correspondingly, an embodiment of the present invention further provides a base station. FIG. 18 is a schematic diagram of a base station according to an embodiment of the present invention. As shown in FIG. 18, this embodiment includes the following components:

a receiver 1801, configured to receive first data sent by a supporting device and transmit the first data to a processor; and the processor 1802, configured to receive the first data sent by the receiver, perform decryption, or decryption and integrity verification on the first data by using a PDCP-layer key of the supporting device, so as to obtain second data, and decrypt the second data by using a cooperative-layer key of a benefited device to obtain third data.

The processor 1802 is further configured to verify integrity of the second data.

For user plane data, the benefited device may not perform integrity protection at a cooperative layer, but performs encryption processing only, and therefore after receiving the data sent by the benefited device, the base station may perform decryption processing on the data, without performing integrity verification. If the benefited device performs not only encryption processing but also integrity protection on the data at the cooperative layer, the base station, after receiving the data sent by the benefited device, needs to perform integrity verification, and after integrity verification is complete, performs decryption, so as to obtain the third data.

The processor 1802 is further configured to obtain the cooperative-layer key. The processor 1802 is specifically configured to: receive the cooperative-layer key sent by a mobility management entity; or perform authentication and key agreement with the benefited device to obtain a parent key, and obtain, through calculation, the cooperative-layer key according to the parent key; or perform authentication and key agreement with the benefited device to obtain a parent key, generate a base-station key according to the parent key, generate an access-stratum key according to the base-station key, and obtain, through calculation, the cooperative-layer key according to the base-station key or the access-stratum key.

Specifically, after EPS AKA is completed by the benefited device and the MME, a parent key Kasme is obtained, and the cooperative-layer key may be generated by using two methods: one method is that the MME generates the cooperative-layer key according to a key derivation function KDF( ) and Kasme, and the other method is that the base station generates the cooperative-layer key according to a base station side key or an access-stratum key. The cooperative-layer key includes encryption keys Int-layer_UPenc and Int-layer_CPenc, and integrity keys Int-layer_Upint and Int-layer_CPint. The encryption key Int-layer_UPenc is used to encrypt user plane data at the cooperative layer, the encryption key Int-layer_CPenc is used to encrypt control plane data at the cooperative layer, the integrity key Int-layer_Upint is used to protect integrity of the user plane data at the cooperative layer, and the integrity key Int-layer_CPint is used to protect integrity of the control plane data at the cooperative layer.

It should be noted that the cooperative-layer key may also be obtained by derivation according to a D-H private key delivered by the network side. Specifically, which method is used to generate the cooperative-layer key may be decided through agreement by the benefited device and the network side.

After the cooperative-layer key is generated, negotiation about a cooperative-layer encryption algorithm used for cooperative-layer encryption and a cooperative-layer integrity protection algorithm may also be performed between the benefited device and the base station to obtain the cooperative-layer encryption algorithm and the integrity protection algorithm that are to be used.

Preferably, the base station further includes: a transmitter 1803. The processor 1802 is further configured to perform, at a cooperative layer by using a cooperative-layer encryption key, encryption processing on data to be sent to the benefited device to obtain fourth data; and the transmitter 1803 is configured to send the fourth data to the supporting device, so that the supporting device processes the fourth data and sends the processed data to the benefited device.

The foregoing describes a process in which after receiving data of a benefited device forwarded through a supporting device, a base station performs processing. When the base station needs to send data to the benefited device, the base station may perform, by using the cooperative-layer encryption key at the cooperative layer and by using the PDCP-layer key of the supporting device at the PDCP layer, encryption processing on the data to be sent to the benefited device, and then send the processed data to the supporting device; after receiving the data, the supporting device performs decryption, or integrity verification and decryption by using the PDCP-layer key at the PDCP layer, and after processing is performed at the cooperative layer, transmits the data to the short-distance communication layer, and after protection is performed at the short-distance communication layer, sends the data to the benefited device; and the benefited device receives the data that is sent by the supporting device in the short-distance communication mode, performs integrity verification and decryption by using the short-distance-communication-layer key, and then performs decryption, or decryption and integrity verification processing on the data by using the cooperative-layer key to obtain decrypted data.

In this way, in the embodiment of the present invention, a problem that in a cooperative communication process, data transmitted between the benefited device and the base station through the supporting device is obtained by the supporting device or eavesdropped and tampered by another device, is avoided. In the present invention, when a sender (the benefited device or the base station) sends data, a key unknown to the supporting device is used to perform encryption and integrity protection on the data at a cooperative layer, so that the supporting device cannot obtain the data; in addition, encryption and integrity protection are performed on the data at a short-distance communication layer, so that the data is not eavesdropped and tampered by another user equipment when the data is transmitted in the short-distance communication mode between the supporting device and the benefited device, thereby implementing secure data transmission between the benefited device, the supporting device, and the base station in the cooperative communication process, and improving network security and reliability of data transmission.

Correspondingly, an embodiment of the present invention further provides a data transmission system, where the foregoing data transmission method is applied to the system, and which includes the foregoing data transmission apparatuses and mobility management entity. In the system, a benefited device obtains a cooperative-layer key, performs encryption, or encryption and integrity protection processing on uplink data by using the cooperative-layer key at a cooperative layer to obtain first encrypted data, performs encapsulation processing on the first encrypted data to obtain first encapsulated data, and sends the first encapsulated data to a supporting device in a short-distance communication mode, so that the supporting device processes the first encapsulated data to obtain second encapsulated data and sends the second encapsulated data to a base station. In this way, a problem that in a cooperative communication process, data transmitted between the benefited device and the base station through the supporting device is obtained by the supporting device or eavesdropped and tampered by another device, is avoided. In the present invention, when a sender (the benefited device or the base station) sends data, a key unknown to the supporting device is used to perform encryption and integrity protection on the data at a cooperative layer, so that the supporting device cannot obtain the data; in addition, encryption and integrity protection are performed on the data at a short-distance communication layer, so that the data is not eavesdropped and tampered by another user equipment when the data is transmitted in the short-distance communication mode between the supporting device and the benefited device, thereby implementing secure data transmission between the benefited device, the supporting device, and the base station in the cooperative communication process, and improving network security and reliability of data transmission.

Correspondingly, an embodiment of the present invention further provides a data transmission system, where the foregoing data transmission method is applied to the system, benefited device, base station, and mobility management entity. In the system, the benefited device obtains a cooperative-layer key, performs encryption, or encryption and integrity protection processing on uplink data by using the cooperative-layer key at a cooperative layer to obtain first encrypted data, performs encapsulation processing on the first encrypted data to obtain first encapsulated data, and sends the first encapsulated data to the supporting device in a short-distance communication mode, so that the supporting device processes the first encapsulated data to obtain second encapsulated data and sends the second encapsulated data to the base station. In this way, a problem that in a cooperative communication process, data transmitted between the benefited device and the base station through the supporting device is obtained by the supporting device or eavesdropped and tampered by another device, is avoided. In the present invention, when a sender (the benefited device or the base station) sends data, a key unknown to the supporting device is used to perform encryption and integrity protection on the data at a cooperative layer, so that the supporting device cannot obtain the data; in addition, encryption and integrity protection are performed on the data at a short-distance communication layer, so that the data is not eavesdropped and tampered by another user equipment when the data is transmitted in the short-distance communication mode between the supporting device and the benefited device, thereby implementing secure data transmission between the benefited device, the supporting device, and the base station in the cooperative communication process, and improving network security and reliability of data transmission.

A person skilled in the art may be further aware that, in combination with the examples described in the embodiments disclosed in this specification, units and algorithm steps may be implemented by electronic hardware, computer software, or a combination thereof. In order to clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

The steps of the method or algorithm according to the embodiments disclosed in this specification may be implemented by hardware or a software module executed by a processor, or implemented by a combination of hardware and a software module executed by a processor. The software module may be stored in a random access memory (RAM), memory, a read-only memory (ROM), an electrically programmable ROM, an electrically erasable programmable ROM, a register, a hard disk, a removable magnetic disk, an optical disc, or a storage medium in any other form known in the art.

The foregoing specific embodiments further describe the objectives, technical solutions, and benefits of the present invention in detail. It should be understood that the foregoing description is merely specific implementation manners of the present invention, but is not intended to limit the protection scope of the present invention. Any modification, equivalent replacement, or improvement made within the spirit and principle of the present invention shall fall within the protection scope of the present invention.

What is claimed is:

1. A data transmission method to improve network security and reliability of the data transmission, comprising:
   obtaining, by a benefited device, a cooperative-layer key hidden from a supporting device, and performing encryption, or encryption and integrity protection processing on uplink data by using the cooperative-layer key at a cooperative layer to obtain first encrypted data so that the supporting device cannot obtain the uplink data;
   performing encapsulation processing on the first encrypted data to obtain first encapsulated data; and
   sending the first encapsulated data to the supporting device in a short-distance communication mode, so that the supporting device processes the first encapsulated data to obtain second encapsulated data and sends the second encapsulated data to a base station, without another user equipment eavesdropping or tampering with the uplink data.

2. The data transmission method according to claim 1, wherein the obtaining, by a benefited device, a cooperative-layer key specifically comprises:
   performing authentication and key agreement with a network side to obtain a parent key, and obtaining, through calculation, the cooperative-layer key according to the parent key; or
   performing authentication and key agreement with a network side to obtain a parent key, generating a base-station key according to the parent key, generating an access-stratum key according to the base-station key, and obtaining, through calculation, the cooperative-layer key according to the base-station key or the access-stratum key.

3. The data transmission method according to claim 2, wherein the method further comprises:
   performing encryption algorithm negotiation with the base station to obtain a cooperative-layer encryption algorithm.

4. A benefited device to improve network security and reliability of data transmission, comprising:
   a processor, configured to obtain a cooperative-layer key hidden from a supporting device, perform encryption, or encryption and integrity protection processing on uplink data by using the cooperative-layer key at a cooperative layer to obtain first encrypted data so that the supporting device cannot obtain the uplink data, perform encapsulation processing on the first encrypted data to obtain first encapsulated data, and transmit the first encapsulated data to a transmitter; and
   the transmitter, configured to receive the first encapsulated data sent by the processor, and send the first encapsulated data to the supporting device in a short-distance communication mode, so that the supporting device processes the first encapsulated data to obtain second encapsulated data and sends the second encapsulated data to a base station without another user equipment eavesdropping or tampering with the uplink data.

5. The benefited device according to claim 4, wherein the processor is specifically configured to:
   perform authentication and key agreement with a network side to obtain a parent key, and obtain, through calculation, the cooperative-layer key according to the parent key; or
   perform authentication and key agreement with a network side to obtain a parent key, generate a base-station key according to the parent key, generate an access-stratum key according to the base-station key, and obtain, through calculation, the cooperative-layer key according to the base-station key or the access-stratum key.

6. The benefited device according to claim 5, wherein the processor is further configured to:
   perform encryption algorithm negotiation with the base station to obtain a cooperative-layer encryption algorithm.

* * * * *